United States Patent
Lee et al.

(10) Patent No.: US 11,968,717 B2
(45) Date of Patent: Apr. 23, 2024

(54) SIGNALING IN A HIGH EFFICIENCY WIRELESS NETWORK

(71) Applicant: Atlas Global Technologies LLC, Austin, TX (US)

(72) Inventors: Dae Won Lee, Austin, TX (US); Yong Ho Seok, Austin, TX (US); Yujin Noh, Austin, TX (US)

(73) Assignee: Atlas Global Technologies LLC, Austin, TX (US)

( * ) Notice: Subject to any disclaimer, the term of this patent is extended or adjusted under 35 U.S.C. 154(b) by 0 days.

(21) Appl. No.: 18/163,741

(22) Filed: Feb. 2, 2023

(65) Prior Publication Data

US 2023/0180295 A1 Jun. 8, 2023

Related U.S. Application Data

(63) Continuation of application No. 17/020,524, filed on Sep. 14, 2020, now Pat. No. 11,576,207, which is a
(Continued)

(51) Int. Cl.
*H04W 84/12* (2009.01)
*H04L 5/00* (2006.01)
*H04L 27/26* (2006.01)

(52) U.S. Cl.
CPC ....... *H04W 74/0816* (2013.01); *H04L 5/0053* (2013.01); *H04L 5/0092* (2013.01);
(Continued)

(58) Field of Classification Search
CPC ..... H04B 1/7143; H04L 5/0053; H04L 12/28; H04L 12/50
(Continued)

(56) References Cited

U.S. PATENT DOCUMENTS

2018/0014329 A1* 1/2018 Lee .................. H04W 74/0816

FOREIGN PATENT DOCUMENTS

WO WO2016191281 12/2016

OTHER PUBLICATIONS

Part 11: Wireless LAN Medium Access Control (MAC) and Physical Layer (PHY) Specifications, Amendment 2: Sub 1 GHz License Exempt Operation, IEEE P802.11ah/D5.0, Mar. 2015, pp. 1-604, IEEE (The Institute of Electrical and Electronic Engineers, Inc.), New York, NY, USA.

(Continued)

*Primary Examiner* — Dang T Ton

(57) ABSTRACT

A wireless device generating a High-Efficiency (HE) PHY Protocol Data Unit (PPDU) for transmission sets a Packet Extension Disambiguity bit of an HE Signal-A (HE-SIG-A) field of the HE PPDU based on respective durations of a packet extension of the HE PPDU and a signal extension of the HE PPDU. The wireless device may determine whether a relationship $$T_{PE} + \left(4 \times \left\lceil \frac{TXTIME - T_{SE} - 20}{4} \right\rceil - (TXTIME - T_{SE} - 20)\right) \geq T_{SYM}$$

is satisfied, where $T_{PE}$ is the duration of the packet extension, TXTIME is a transmission time of the HE PPDU, $T_{SE}$ is the duration of the signal extension, and $T_{SYM}$ is a duration of symbols in a data field of the HE PPDU. The wireless device may set the Packet Extension Disambiguity bit to one when the relationship is satisfied; and to zero when the relationship is not satisfied.

12 Claims, 20 Drawing Sheets

Related U.S. Application Data continuation of application No. 16/576,624, filed on Sep. 19, 2019, now Pat. No. 10,805,956, which is a continuation of application No. 15/647,197, filed on Jul. 11, 2017, now Pat. No. 10,470,214.

(60) Provisional application No. 62/380,926, filed on Aug. 29, 2016, provisional application No. 62/360,915, filed on Jul. 11, 2016.

(52) U.S. Cl.
CPC ...... *H04L 27/2602* (2013.01); *H04L 27/2603* (2021.01); *H04W 84/12* (2013.01)

(58) Field of Classification Search
USPC .......................................... 370/329, 400, 395

See application file for complete search history.

(56) References Cited

OTHER PUBLICATIONS

Part 11: Wireless LAN Medium Access Control (MAC) and Physical Layer (PHY) Specifications, Amendment 4: Enhancements for Very High Throughput for Operation in Bands below 6 GHz, IEEE Standards 802.11ac, 2013, pp. 1-395, IEEE (The Institute of Electrical and Electronic Engineers, Inc.), New York, NY, USA.
Part 11: Wireless LAN Medium Access Control (MAC) and Physical Layer (PHY) Specifications, IEEE Standards 802.11, (Revision of IEEE Standard 802.11-2007), Mar. 29, 2012, pp. 1-2695, IEEE (The Institute of Electrical and Electronic Engineers, Inc.), New York, NY, USA.
Search Report dated Nov. 7, 2017 for European Application No. 17180624.3.
Stacey, Specification Framework for TGax, IEEE 802.11-15/0132r8, 2015, pp. 22.
Zhang et al., HE PHY Padding and Packet Extension, IEEE 802.11-15/0810, 2015, pp. 46.

* cited by examiner

FIG. 6A

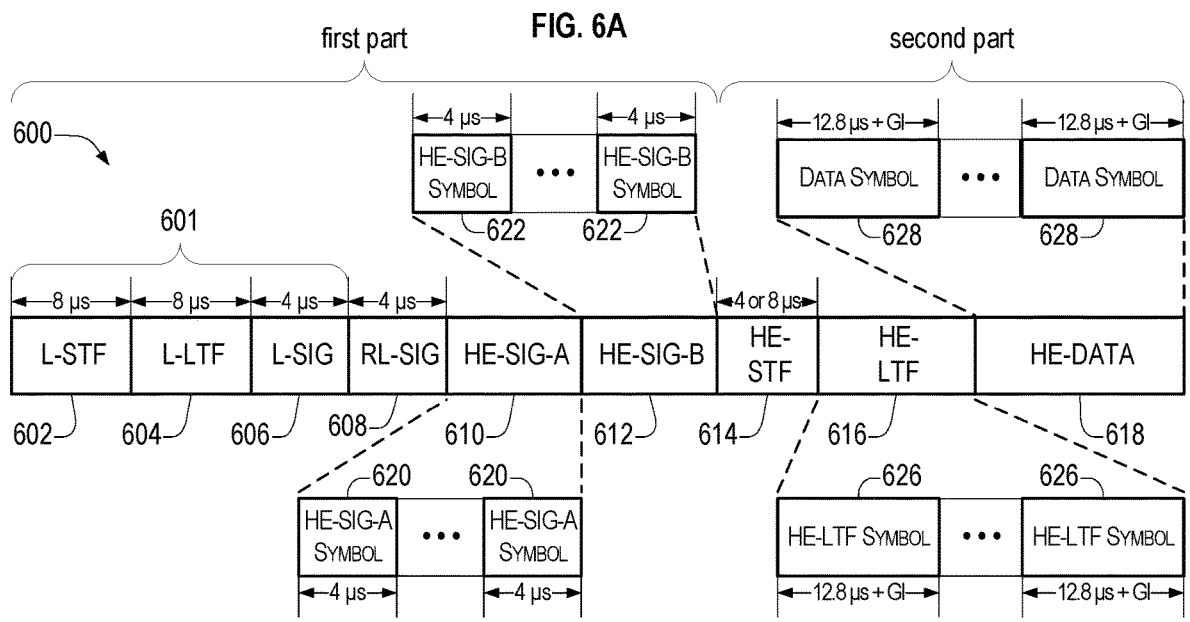

FIG. 6B

Table 1:

| Element | definition | duration | DFT period | GI | Subcarrier spacing |
|---|---|---|---|---|---|
| Legacy (L)-STF | Non-HT Short Training field | 8 µs | - | - | equiv. to 1,250 kHz |
| L-LTF | Non-HT Long Training field | 8 µs | 3.2 µs | 1.6 µs | 312.5 kHz |
| L-SIG | Non-HT Signal field | 4 µs | 3.2 µs | 0.8 µs | 312.5 kHz |
| RL-SIG | Repeated Non-HT SIGNAL field | 4 µs | 3.2 µs | 0.8 µs | 312.5 kHz |
| HE-SIG-A | HE SIGNAL A field | $N_{HESIGA} * 4$ µs | 3.2 µs | 0.8 µs | 312.5 kHz |
| HE-SIG-B | HE SIGNAL B field | $N_{HESIGB} * 4$ µs | 3.2 µs | 0.8 µs | 312.5 kHz |
| HE-STF | HE Short Training field | 4 or 8 µs | - | - | • non-trigger-based PPDU: (equiv. to) 1,250 kHz;<br>• trigger-based PPDU: (equiv. to) 625 kHz |
| HE-LTF | HE Long Training field | $N_{HELTF} *$ (DFT period + GI)µs | 2xLTF: 6.4 µs<br>4xLTF: 12.8 µs | supports 0.8, 1.6, 3.2 µs | • 2xLTF: (equiv. to) 156.25 kHz;<br>• 4xLTF: 78.125 kHz |
| HE-DATA | HE DATA field | $N_{DATA} *$ (DFT period + GI)µs | 12.8 µs | supports 0.8, 1.6, 3.2 µs | 78.125 kHz |

FIG. 7

Table 2: Timing Related Constants

| Parameter | Values | Description |
|---|---|---|
| $T_{DFT,Pre\text{-}HE}$ | 3.2 μs | IDFT/DFT period for pre-HE modulated fields |
| $T_{DFT,HE}$ | 12.8 μs | IDFT/DFT period for HE Data field |
| $T_{GI,Pre\text{-}HE}$ | 0.8 μs | Guard interval duration for legacy preamble, RL-SIG, HE-SIG-A and HE-SIG-B |
| $T_{GI,HE\text{-}LTF}$ | $T_{GI1,Data}$, $T_{GI2,Data}$ or $T_{GI4,Data}$ depending on GI used for data | Guard interval duration for HE-LTF, same as $T_{GI,Data}$ |
| $T_{GI,Data}$ | $T_{GI1,Data}$, $T_{GI2,Data}$ or $T_{GI4,Data}$ depending on GI used for data | Guard interval duration for HE-Data field |
| $T_{GI1,Data}$ | 0.8 μs | Base guard interval duration for HE-Data field. |
| $T_{GI2,Data}$ | 1.6 μs | Double guard interval duration for HE-Data field. |
| $T_{GI4,Data}$ | 3.2 μs | Quadruple guard interval duration for HE-Data field. |
| $T_{SYM1}$ | 13.6 μs = $T_{DFT,HE}$ + $T_{GI1,Data}$ = 1.0625 × $T_{DFT,HE}$ | OFDM symbol duration with base GI |
| $T_{SYM2}$ | 14.4 μs = $T_{DFT,HE}$ + $T_{GI2,Data}$ = 1.125 × $T_{DFT,HE}$ | OFDM symbol duration with double GI |
| $T_{SYM4}$ | 16 μs = $T_{DFT,HE}$ + $T_{GI4,Data}$ = 1.25 × $T_{DFT,HE}$ | OFDM symbol duration with quadruple GI |
| $T_{SYM}$ | $T_{SYM1}$, $T_{SYM2}$, or $T_{SYM4}$ depending on GI used | Symbol interval of Data symbols |
| $T_{L\text{-}STF}$ | 8 μs = 10 × $T_{DFT,Pre\text{-}HE}$ /4 | Non-HT Short Training field duration |
| $T_{L\text{-}LTF}$ | 8 μs = 2 × $T_{DFT,Pre\text{-}HE}$ + $T_{GI2,Data}$ | Non-HT Long Training field duration |
| $T_{L\text{-}SIG}$ | 4 μs | Non-HT SIGNAL field duration |
| $T_{RL\text{-}SIG}$ | 4 μs | Repeated non-HT SIGNAL field duration |
| $T_{HE\text{-}SIG\text{-}A}$ | 8 μs = 2 × 4 μs | HE-SIG-A field duration in an HE SU PPDU, HE MU PPDU and HE trigger-based PPDU |
| $T_{HE\text{-}SIG\text{-}A\text{-}R}$ | 16 μs = 4 × 4 μs(#279) | HE-SIG-A field duration in HE extended range SU PPDU |
| $T_{HE\text{-}STF\text{-}T}$ | 8 μs = 5 × 1.6 μs | HE-STF duration for HE trigger-based PPDU |
| $T_{HE\text{-}STF\text{-}NT}$ | 4 μs = 5 × 0.8 μs | HE-STF field duration for HE SU PPDU, HE extended range SU PPDU and HE MU PPDU |
| $T_{HE\text{-}LTF\text{-}1X}$ | 3.2 μs | Duration of each 1x HE-LTF OFDM symbol without GI |
| $T_{HE\text{-}LTF\text{-}2X}$ | 6.4 μs | Duration of each 2x HE-LTF OFDM symbol without GI |
| $T_{HE\text{-}LTF\text{-}4X}$ | 12.8 μs | Duration of each 4x HE-LTF OFDM symbol without GI |
| $T_{HE\text{-}LTF}$ | $T_{HE\text{-}LTF\text{-}1X}$, $T_{HE\text{-}LTF\text{-}2X}$ or $T_{HE\text{-}LTF\text{-}4X}$ depending on LTF duration used | Duration of each OFDM symbol without GI in HE-LTF field |
| $T_{HE\text{-}LTF\text{-}SYM}$ | sum of $T_{HE\text{-}LTF}$ and $T_{GI,HE\text{-}LTF}$ | Duration of each OFDM symbol including GI in HE-LTF field |
| $T_{HE\text{-}SIG\text{-}B}$ | 4 μs = $T_{DFT,Pre\text{-}HE}$ + $T_{GI,Pre\text{-}HE}$ | Duration of each OFDM symbol in HE-SIG-B field |
| $N_{service}$ | 16 | Number of bits in SERVICE field |
| $N_{tail}$ | 6 | Number of tail bits per BCC encoder |
| $T_{SYML}$ | 4 μs | Symbol duration including GI prior to HE-STF |
| $T_{PE}$ | 0, 4, 8, 12, or 16 μs depending on actual extension duration used | Duration of Packet Extension field |

FIG. 8
Table 3: Packet Extension (PE) field bits
| Name | bits | Definition |
|---|---|---|
| a-factor | B0-B1 | Indicates a-factor value of current PPDU |
| PE Disambiguity | B2 | Indicates PE disambiguity |
FIG. 9A
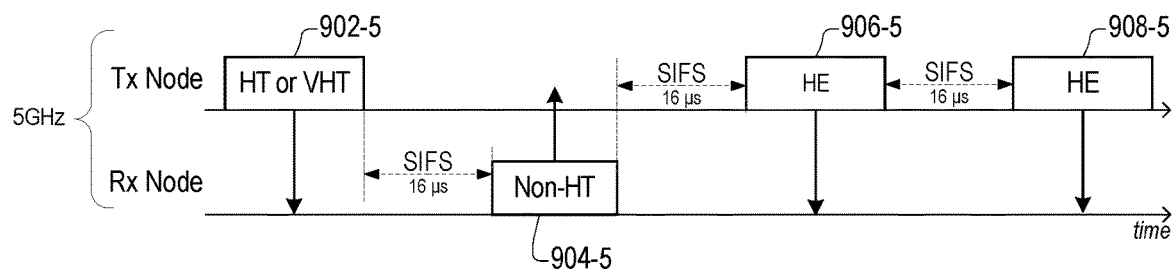
FIG. 9B
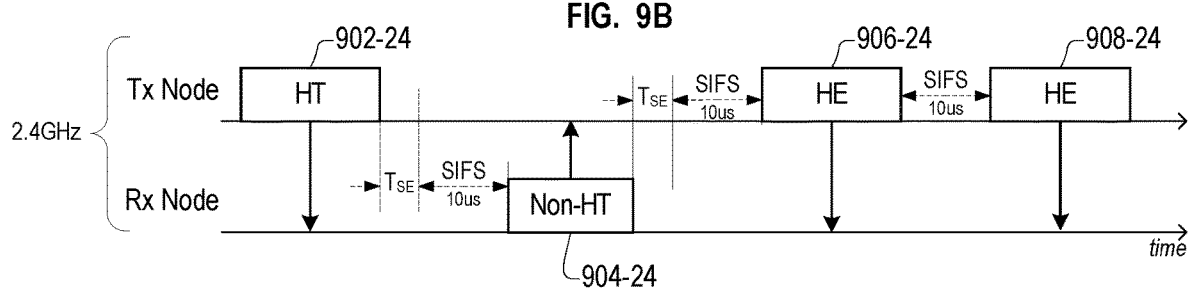
FIG. 10
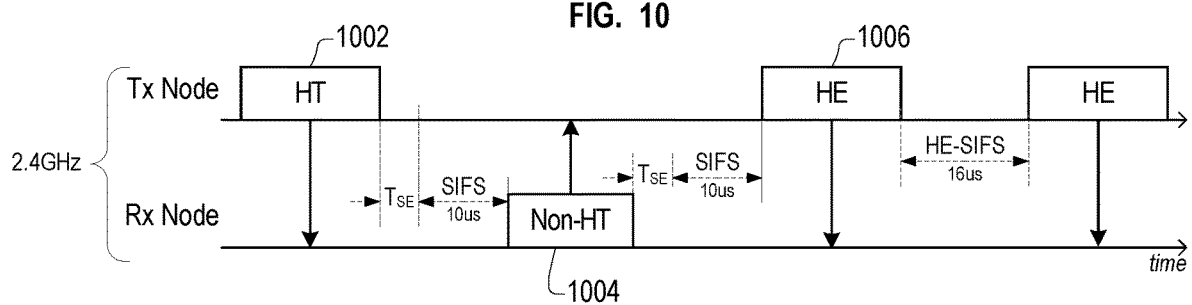

NOTE—This procedure does not describe the operation of optional features

NOTE—This procedure does not describe the operation of optional features

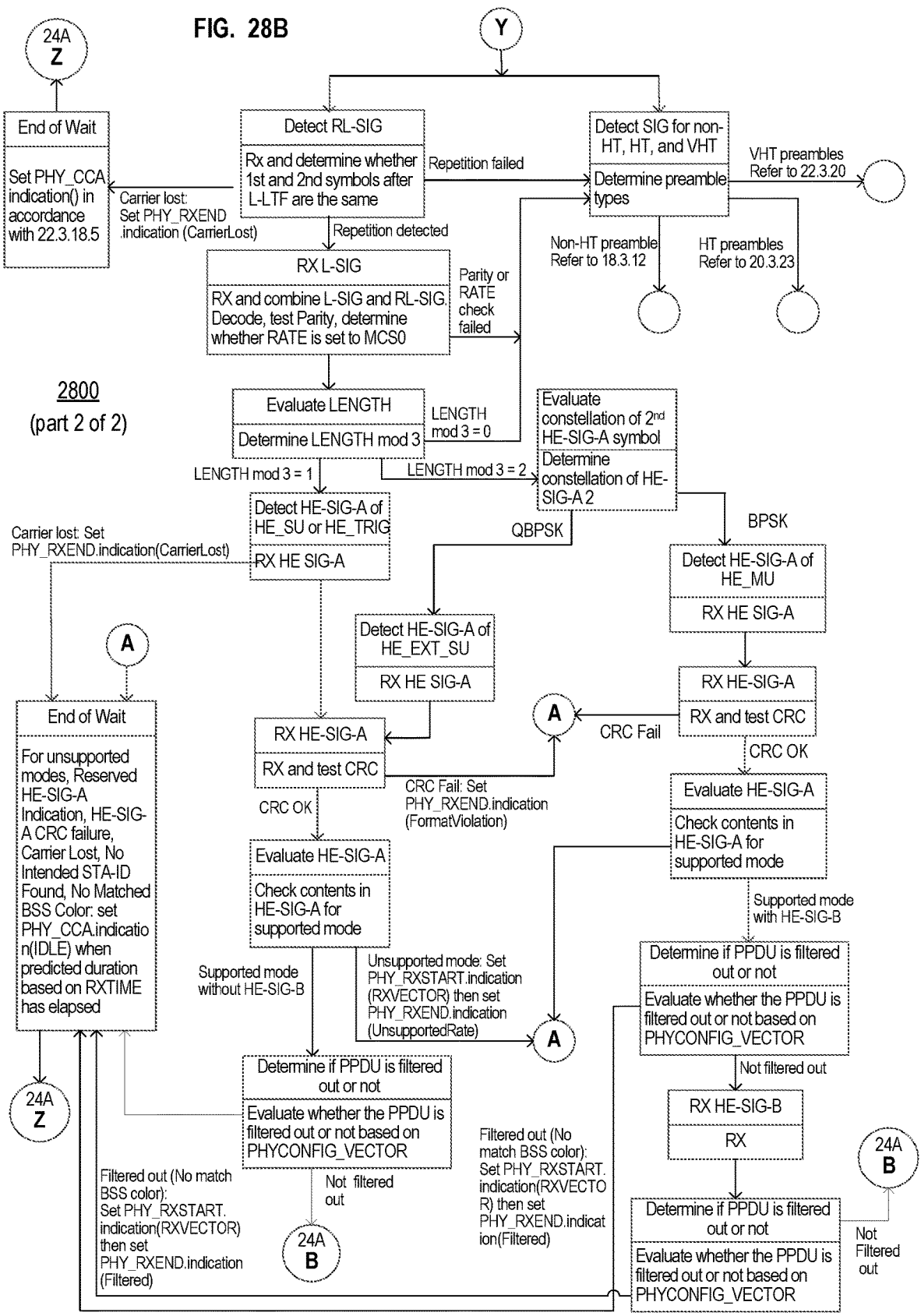

SIGNALING IN A HIGH EFFICIENCY WIRELESS NETWORK

CROSS-REFERENCE TO RELATED APPLICATION

This application is a continuation of U.S. application Ser. No. 17/020,524, filed Sep. 14, 2020, and issued as U.S. Pat. No. 11,576,207 on Feb. 7, 2023, which is a continuation of U.S. application Ser. No. 16/576,624, filed Sep. 19, 2019 and issued as U.S. Pat. No. 10,805,956 on Oct. 13, 2020, which is a continuation of U.S. application Ser. No. 15/647,197, filed Jul. 11, 2017 and issued as U.S. Pat. No. 10,470,214 on Nov. 5, 2019, which claims the benefit of U.S. Provisional Patent Application No. 62/360,915, filed Jul. 11, 2016, and U.S. Provisional Patent Application No. 62/380,926, filed Aug. 29, 2016, which are incorporated by reference herein in their entireties.

BACKGROUND

1. Technical Field

The technology described herein relates generally to wireless networking. More particularly, the technology relates to one or more of determining a disambiguity indication for a transmission in a wireless network and determining an indication of a transmission time for a transmission in the wireless network.

2. Description of the Related Art

Wireless Local Area Network (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (IEEE 802.11ac).

Recently, an amendment focused on providing a High Efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

Fairness in obtaining the use of a wireless medium between different kinds of devices minimizes the probability that any one device will be unable to make sufficient use of the wireless medium. A difference in how different devices determine a length of a transmission made by another device can affect the fairness of obtaining the use of a wireless medium.

SUMMARY

In an embodiment, a method performed by a wireless device comprises generating a High-Efficiency (HE) PHY Protocol Data Unit (PPDU) for transmission. Generating the HE PPDU includes setting a Packet Extension Disambiguity bit of an HE Signal-A (HE-SIG-A) field of the HE PPDU to one or zero based on a duration of a packet extension of the HE PPDU and a duration of a signal extension of the HE PPDU. The method further comprises transmitting the HE PPDU.

In an embodiment, setting the Packet Extension Disambiguity bit comprises determining whether a relationship $$T_{PE} + \left(4 \times \left\lceil \frac{TXTIME - T_{SE} - 20}{4} \right\rceil - (TXTIME - T_{SE} - 20)\right) \geq T_{SYM}$$

is satisfied, where $T_{PE}$ is the duration of the packet extension of the HE PPDU, TXTIME is a transmission time of the HE PPDU, $T_{SE}$ is the duration of the signal extension of the HE PPDU, $\lceil x \rceil$ is the ceiling of x, and $T_{SYM}$ is a duration of symbols in a data field of the HE PPDU. The Packet Extension Disambiguity bit is set to one when the relationship is satisfied, and set to zero when the relationship is not satisfied.

In an embodiment, $T_{SE}$ is 6 μs when the wireless device is operating in a 2.4 GHz band, and 0 μs when the wireless device is operating in a 5 GHz band.

In an embodiment, generating the HE PPDU further includes determining a value L_LENGTH of a Length field of a Non-HT Signal (L-SIG) field of the HE PPDU according to $$L\_LENGTH = \left\lceil \frac{TXTIME - T_{SE} - 20}{4} \right\rceil \times 3 - 3 - m,$$

where m is 1 when the HE PPDU is an HE Multi User (MU) PPDU HE or Extended Range Single User (SU) PPDU and 2 otherwise.

In an embodiment, the method further comprises when the HE PPDU is an HE Single User (SU) PPDU, determining the transmission time TXTIME according to:

$$TXTIME = T_{LEG-PREAMBLE} + T_{L-SIG} + T_{RL-SIG} + \\ T_{HE-SIG-A} + T_{HE-PREAMBLE} + N_{SYM}T_{SYM} + T_{PE} + T_{SE}$$

where $T_{L-STF}$ is a non-HT Short Training Filed (STF) duration of the HE PPDU, $T_{L-LTF}$ is a Non-HT Long Training Field (LTF) duration of the HE PPDU, $T_{HE-STF-NT}$ is an HE STF duration of the HE PPDU, $T_{L-SIG}$ is a Non-HT Signal (L-SIG) field duration of the HE PPDU, $T_{RL-SIG}$ is a Repeated non-HT SIGNAL field duration of the HE PPDU, $T_{HE-SIG-A}$ is an HE Signal A (HE-SIG-A) field duration of the HE PPDU, $N_{SYM}$ is a number of symbols in a data field of the HE PPDU, $T_{HE-LTF-SYM}$ is a duration of each Orthogonal Frequency Division Modulation (OFDM) symbol, including Guard Interval (GI), in an HE-LTF field of the HE PPDU, $N_{HE-LTF}$ is a number of symbols in the HE LTF field of the HE PPDU, $T_{LEG-PREAMBLE}$ is equal to $T_{L-STF}+T_{L-LTF}$, and $T_{HE-PREAMBLE}$ is equal to $T_{HE-STF-NT}+N_{HE-LTF}\times T_{HE-LTF-SYM}$.

In an embodiment, the method further comprises when the HE PPDU is an HE trigger-based PPDU, determining the transmission time TXTIME according to:

$$TXTIME = T_{LEG-PREAMBLE} + T_{L-SIG} + T_{RL-SIG} +$$
$$T_{HE-SIG-A} + T_{HE-PREAMBLE} + N_{SYM}T_{SYM} + T_{PE} + T_{SE}$$

where $T_{L-STF}$ is a non-HT STF duration of the HE PPDU, $T_{L-LTF}$ is a Non-HT LTF duration of the HE PPDU, $T_{HE-STF-T}$ is an HE STF duration of the HE PPDU, $T_{L-SIG}$ is an L-SIG field duration of the HE PPDU, $T_{RL-SIG}$ is a Repeated non-HT SIGNAL field duration of the HE PPDU, $T_{HE-SIG-A}$ is an HE-SIG-A field duration of the HE PPDU, $N_{SYM}$ is a number of symbols in a data field of the HE PPDU, $T_{HE-LTF-SYM}$ is a duration of each OFDM symbol, including GI, in an HE-LTF field of the HE PPDU, $N_{HE-LTF}$ is a number of symbols in the HE LTF field of the HE PPDU, $T_{LEG-PREAMBLE}$ is equal to $T_{L-STF}+T_{L-LTF}$, and $T_{HE-PREAMBLE}$ is equal to $T_{HE-STF-T}+N_{HE-LTF}\times T_{HE-LTF-SYM}$.

In an embodiment, the method further comprises when the HE PPDU is an HE Multi User (MU) PPDU, determining the transmission time TXTIME according to:

$$TXTIME = T_{LEG-PREAMBLE} + T_{L-SIG} + T_{RL-SIG} + T_{HE-SIG-A} +$$
$$N_{HE-SIG-B}T_{HE-SIG-B} + T_{HE-PREAMBLE} + N_{SYM}T_{SYM} + T_{PE} + T_{SE}$$

where $T_{L-STF}$ is a non-HT STF duration of the HE PPDU, $T_{L-LTF}$ is a Non-HT LTF duration of the HE PPDU, $T_{HE-STF-NT}$ is an HE STF duration of the HE PPDU, $T_{L-SIG}$ is an L-SIG field duration of the HE PPDU, $T_{RL-SIG}$ is a Repeated non-HT SIGNAL field duration of the HE PPDU, $T_{HE-SIG-A}$ is an HE-SIG-A field duration of the HE PPDU, $T_{HE-SIG-B}$ is an duration of each OFDM symbol in an HE Signal B (HE-SIG-B) field of the HE PPDU, $N_{HE-SIG-B}$ is a number of symbols in the HE-SIG-B field of the HE PPDU, $N_{SYM}$ is a number of symbols in a data field of the HE PPDU, $T_{HE-LTF-SYM}$ is a duration of each OFDM symbol, including GI, in an HE-LTF field of the HE PPDU, $N_{H-LTF}$ is a number of symbols in an HE LTF field of the HE PPDU, $T_{LEG-PREAMBLE}$ is equal to $T_{L-STF}+T_{L-LTF}$, and $T_{HE-PREAMBLE}$ is equal to $T_{HE-STF-NT}+N_{HE-LTF}\times T_{HE-LTF-SYM}$.

In an embodiment, the method further comprises when the HE PPDU is an HE Extended Range Single User (SU) PPDU, determining the transmission time TXTIME according to:

$$TXTIME = T_{LEG-PREAMBLE} + T_{L-SIG} + T_{RL-SIG} + T_{HE-SIG-A} +$$
$$T_{HE-SIG-A-R} + T_{HE-PREAMBLE} + N_{SYM}T_{SYM} + T_{PE} + T_{SE}$$

where $T_{L-STF}$ is a non-HT STF duration, $T_{L-LTF}$ is a Non-HT LTF duration, $T_{HE-STF-NT}$ is an HE STF duration, $T_{L-SIG}$ is an L-SIG field duration, $T_{RL-SIG}$ is a repeated non-HT SIGNAL field duration, $T_{HE-SIG-A}$ is an HE-SIG-A field duration, $T_{HE-SIG-A-R}$ is an HE-SIG-A field duration for Extended Range, $N_{SYM}$ is a number of symbols in a data field of the HE PPDU, $T_{HE-LTF-SYM}$ is a duration of each OFDM symbol, including GI, in an HE-LTF field of the HE PPDU, $N_{HE-LTF}$ is a number of symbols in an HE LTF field of the HE PPDU, $T_{LEG-PREAMBLE}$ is equal to $T_{L-STF}+T_{L-LTF}$, and $T_{HE-PREAMBLE}$ is equal to $T_{HE-STF-NT}+N_{HE-LTF}\times T_{HE-LTF-SYM}$.

In an embodiment, a wireless device comprises a transmitter circuit. The wireless device generates a High-Efficiency (HE) PHY Protocol Data Unit (PPDU) and transmits, using the transmitter circuit, the HE PPDU. Generating the HE PPDU includes setting a Packet Extension Disambiguity bit of an HE Signal-A (HE-SIG-A) field of the HE PPDU to one or zero based on a duration of a packet extension of the HE PPDU and a duration of a signal extension of the HE PPDU.

In an embodiment, setting the Packet Extension Disambiguity bit comprises determining whether a relationship $$T_{PE} + \left(4\times \left\lceil \frac{TXTIME - T_{SE} - 20}{4} \right\rceil - (TXTIME - T_{SE} - 20)\right) \geq T_{SYM}$$

is satisfied, where $T_{PE}$ is a duration of the packet extension of the HE PPDU, TXTIME is a transmission time of the HE PPDU, $T_{SE}$ is the duration of the signal extension of the HE PPDU, and $T_{SYM}$ is a duration of symbols in a data field of the HE PPDU. The Packet Extension Disambiguity bit of the HE-SIG-A field of the HE PPDU is set to one when the relationship is satisfied, and set to zero when the relationship is not satisfied.

In an embodiment, $T_{SE}$ is 6 µs when the wireless device is operating in a 2.4 GHz band, and 0 µs when the wireless device is operating in a 5 GHz band.

In an embodiment, generating the HE PPDU further includes determine a value L_LENGTH of a Length field of a Non-HT Signal (L-SIG) field of the HE PPDU according to $$L\_LENGTH = \left\lceil \frac{TXTIME - T_{SE} - 20}{4} \right\rceil \times 3 - 3 - m,$$

where m is 1 when the HE PPDU is an HE Multi User (MU) PPDU HE or Extended Range Single User (SU) PPDU and 2 otherwise.

An embodiment further comprises the wireless device determining the TXTIME when the HE PPDU is an HE Single User (SU) PPDU according to:

$$TXTIME = T_{LEG-PREAMBLE} + T_{L-SIG} + T_{RL-SIG} +$$
$$T_{HE-SIG-A} + T_{HE-PREAMBLE} + N_{SYM}T_{SYM} + T_{PE} + T_{SE}$$

where $T_{L-STF}$ is a Non-High Throughput (non-HT) Short Training Field (STF) duration of the HE PPDU, $T_{L-LTF}$ is a Non-HT Long Training Field (LTF) duration of the HE PPDU, $T_{HE-STF-NT}$ is an HE STF duration of the HE PPDU, $T_{L-SIG}$ is a Non-HT Signal (L-SIG) field duration of the HE PPDU, $T_{RL-SIG}$ is a Repeated non-HT SIGNAL field duration of the HE PPDU, $T_{HE-SIG-A}$ is an HE Signal A (HE-SIG-A) field duration of the HE PPDU, $N_{SYM}$ is a number of symbols in a data field of the HE PPDU, $T_{HE-LTF-SYM}$ is a duration of each Orthogonal Frequency Division Modulation (OFDM) symbol, including Guard Interval (GI), in an HE-LTF field of the HE PPDU, $N_{HE-LTF}$ is a number of symbols in the HE LTF field of the HE PPDU, $T_{LEG-PREAMBLE}$ is equal to $T_{L-STF}+T_{L-LTF}$, and $T_{HE-PREAMBLE}$ is equal to $T_{HE-STF-NT}+N_{HE-LTF}\times T_{HE-LTF-SYM}$.

An embodiment further comprises the wireless device determining the TXTIME when the HE PPDU is an HE trigger-based PPDU according to:

$$TXTIME = T_{LEG-PREAMBLE} + T_{L-SIG} + T_{RL-SIG} +$$
$$T_{HE-SIG-A} + T_{HE-PREAMBLE} + N_{SYM}T_{SYM} + T_{PE} + T_{SE}$$

where $T_{L-STF}$ is a Non-High Throughput (non-HT) Short Training Field (STF) duration of the HE PPDU, $T_{L-LTF}$ is a Non-HT Long Training Field (LTF) duration of the HE PPDU, $T_{HE-STF-T}$ is an HE STF duration of the HE PPDU, TL-SIG is a Non-HT Signal (L-SIG) field duration of the HE PPDU, $T_{RL-SIG}$ is a Repeated non-HT SIGNAL field duration of the HE PPDU, $T_{HE-SIG-A}$ is an HE Signal A (HE-SIG-A) field duration of the HE PPDU, $N_{SYM}$ is a number of symbols in a data field of the HE PPDU, $T_{HE-LTF-SYM}$ is a duration of each Orthogonal Frequency Division Modulation (OFDM) symbol, including Guard Interval (GI), in an HE-LTF field of the HE PPDU, $N_{HE-LTF}$ is a number of symbols in the HE LTF field of the HE PPDU, $T_{LEG-PREAMBLE}$ is equal to $T_{L-STF}+T_{L-LTF}$, and $T_{HE-PREAMBLE}$ is equal to $T_{HE-STF-T}+N_{HE-LTF}\times T_{HE-LTF-SYM}$.

An embodiment further comprises the wireless device determining the TXTIME when the HE PPDU is an HE Multi User (MU) PPDU according to:

$$TXTIME = T_{LEG-PREAMBLE} + T_{L-SIG} + T_{RL-SIG} + T_{HE-SIG-A} +$$
$$N_{HE-SIG-B}T_{HE-SIG-B} + T_{HE-PREAMBLE} + N_{SYM}T_{SYM} + T_{PE} + T_{SE}$$

where $T_{L-STF}$ is a Non-High Throughput (non-HT) Short Training Field (STF) duration of the HE PPDU, $T_{L-LTF}$ is a Non-HT Long Training Field (LTF) duration of the HE PPDU, $T_{HE-STF-NT}$ is an HE STF duration of the HE PPDU, $T_{L-SIG}$ is a Non-HT Signal (L-SIG) field duration of the HE PPDU, $T_{RL-SIG}$ is a Repeated non-HT SIGNAL field duration of the HE PPDU, $T_{HE-SIG-A}$ is an HE Signal A (HE-SIG-A) field duration of the HE PPDU, $T_{HE-SIG-B}$ is an duration of each OFDM symbol in an HE Signal B (HE-SIG-B) field of the HE PPDU, $N_{HE-SIG-B}$ is a number of symbols in the HE-SIG-B field of the HE PPDU, $N_{SYM}$ is a number of symbols in a data field of the HE PPDU, $T_{HE-LTF-SYM}$ is a duration of each Orthogonal Frequency Division Modulation (OFDM) symbol, including Guard Interval (GI), in an HE-LTF field of the HE PPDU, $N_{HE-LTF}$ is a number of symbols in an HE LTF field of the HE PPDU, $T_{LEG-PREAMBLE}$ is equal to $T_{L-STF}+T_{L-LTF}$, and $T_{HE-PREAMBLE}$ is equal to $T_{HE-STF-NT}+N_{HE-LTF}\times T_{HE-LTF-SYM}$.

An embodiment further comprises the wireless device determining the TXTIME when the HE PPDU is an HE Extended Range Single User (SU) PPDU according to:

$$TXTIME = T_{LEG-PREAMBLE} + T_{L-SIG} + T_{RL-SIG} + T_{HE-SIG-A} +$$
$$T_{HE-SIG-A-R} + T_{HE-PREAMBLE} + N_{SYM}T_{SYM} + T_{PE} + T_{SE}$$

where $T_{L-STF}$ is a Non-High Throughput (non-HT) Short Training Field (STF) duration, $T_{L-LTF}$ is a Non-HT Long Training Field (LTF) duration, $T_{HE-STF-NT}$ is an HE STF duration, $T_{L-SIG}$ is a Non-HT Signal (L-SIG) field duration, $T_{RL-SIG}$ is a repeated non-HT SIGNAL field duration, $T_{HE-SIG-A}$ is an HE Signal A (HE-SIG-A) field duration, $T_{HE-SIG-A-R}$ is an HE-SIG-A field duration for Extended Range, $N_{SYM}$ is a number of symbols in a data field of the HE PPDU, $T_{HE-LTF-SYM}$ is a duration of each Orthogonal Frequency Division Modulation (OFDM) symbol, including Guard Interval (GI), in an HE-LTF field of the HE PPDU, $N_{HE-LTF}$ is a number of symbols in an HE LTF field of the HE PPDU, $T_{LEG-PREAMBLE}$ is equal to $T_{L-STF}+T_{L-LTF}$, and $T_{HE-PREAMBLE}$ is equal to $T_{HE-STF-NT}+N_{HE-LTF}\times T_{HE-LTF-SYM}$.

BRIEF DESCRIPTION OF THE DRAWINGS

FIG. 6A illustrates a High Efficiency (HE) PHY Protocol Data Units (PPDU), according to an embodiment.

FIG. 6B shows a Table 1 disclosing additional properties of fields of the HE PPDU frame of FIG. 6A, according to an embodiment.

FIG. 7 includes a table of timing-related constants, according to an embodiment.

FIG. 8 includes a table showing a Packet Extension field in an HE Signal A (HE-SIG-A) field, according to an embodiment.

FIG. 9A illustrates inter-frame time intervals between Non-HT, HT, and HE PPDUs in a 5 GHz band.

FIG. 9B illustrates inter-frame time intervals between Non-HT, HT, and HE PPDUs in a 2.4 GHz band.

FIG. 10 illustrates inter-frame time intervals between Non-HT, HT, and HE PPDUs in a 2.4 GHz band, according to an embodiment.

FIGS. 28A and 28B illustrate a PHY receive state machine for an HE-capable PHY, according to an embodiment.

DETAILED DESCRIPTION

Figure 1:
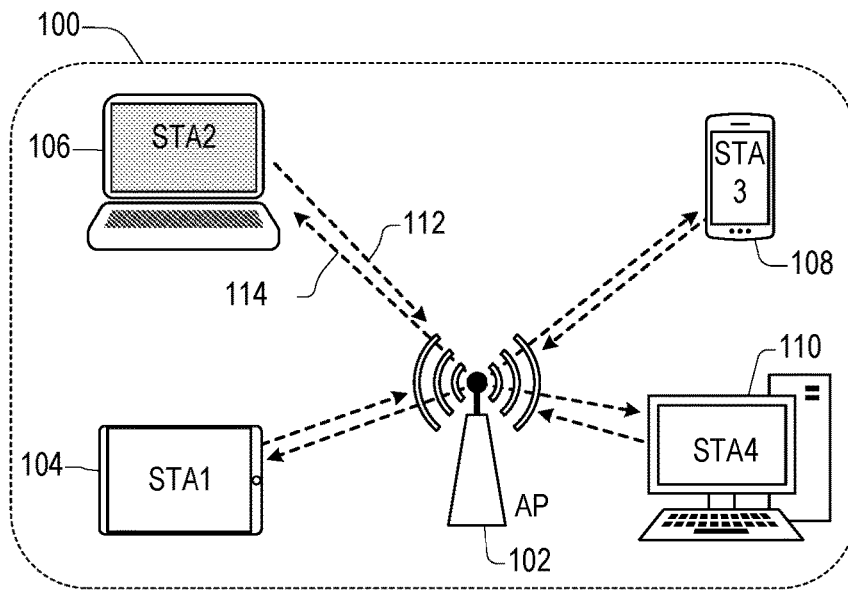
FIG. 1 illustrates a wireless network, according to an embodiment.

The technology described herein relates generally to wireless networking. More particularly, the technology relates to improving fairness of access to a wireless medium including a 2.4 GHz band in situations where both stations capable of performing High Efficiency (HE) WLAN operations (HE stations) and stations not capable of performing HE WLAN operations (non-HE stations) are competing for access to the 2.4 GHz band.

In the following detailed description, certain illustrative embodiments have been illustrated and described. As those skilled in the art would realize, these embodiments are capable of modification in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless networks includes an infrastructure Basic Service Set (BSS) 100 of a Wireless Local Area Networks (WLAN). In an 802.11 WLAN, the BSS provides the basic organizational unit and typically includes an Access Point (AP) and one or more associated stations (STAs).

The first BSS 100 includes an Access Point 102 (also referred to as AP) wirelessly communicating with first, second, third, and fourth wireless devices (or stations) 104, 106, 108, and 110 (also referred to as stations STA1, STA2, STA3, and STA4, respectively). The wireless devices may each include a medium access control (MAC) layer and a physical (PHY) layer according to an IEEE 802.11 standard.

Although FIG. 1 shows the first BSS 100 including only the first to fourth stations STA1 to STA4, embodiments are not limited thereto and may comprise BSSs including any number of stations.

The AP 102 is a station, that is, a STA, configured to control and coordinate functions of the BSS 100. The AP 102 may transmit information to a single station selected from the plurality of stations STA1 to STA4 in the first BSS 100 using a single frame, or may simultaneously transmit information to two or more of the stations STA1 to STA4 in the first BSS 100 using either a single Orthogonal Frequency Division Multiplexing (OFDM) broadcast frame, a single OFDM Multi-User Multi-Input-Multi-Output (MU-MIMO) transmission, a single Orthogonal Frequency Division Multiple Access (OFDMA) frame, or a single MU-MIMO OFDMA frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame, an UL MU-MIMO frame, or an UL MU-MIMO OFDMA frame.

In another embodiment, the AP 102 may be absent and the stations STA1 to STA4 may be in an ad-hoc network.

FIG. 1 shows a first Down-Link (DL) transmission 114 and a first Up-Link (UL) transmission 112 of the first BSS 100.

Each of the stations STA1 to STA4 and the AP 102 includes a processor and one or more transceiver circuits, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium.

The transceiver represents a unit functionally connected to the processor, and designed to transmit and receive a frame through the wireless network. The transceiver may include a single component that performs the functions of transmitting and receiving, or two separate components each performing one of such functions.

The processor and transceiver of the stations STA1 to STA4 and the AP 102 may be respectively implemented using hardware components, software components, or both.

The first AP 102 may be or include a WLAN router, a stand-alone Access Point, a WLAN bridge, a Light-Weight Access Point (LWAP) managed by a WLAN controller, and the like. In addition, a device such as a personal computer, tablet computer, or cellular phone may configured to be able to operate as the AP 102, such as when a cellular phone is configured to operate as a wireless "hot spot."

Each of the stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and/or a subtype field included in a control field of the frame, as prescribed in the applicable standard.

Figure 2:
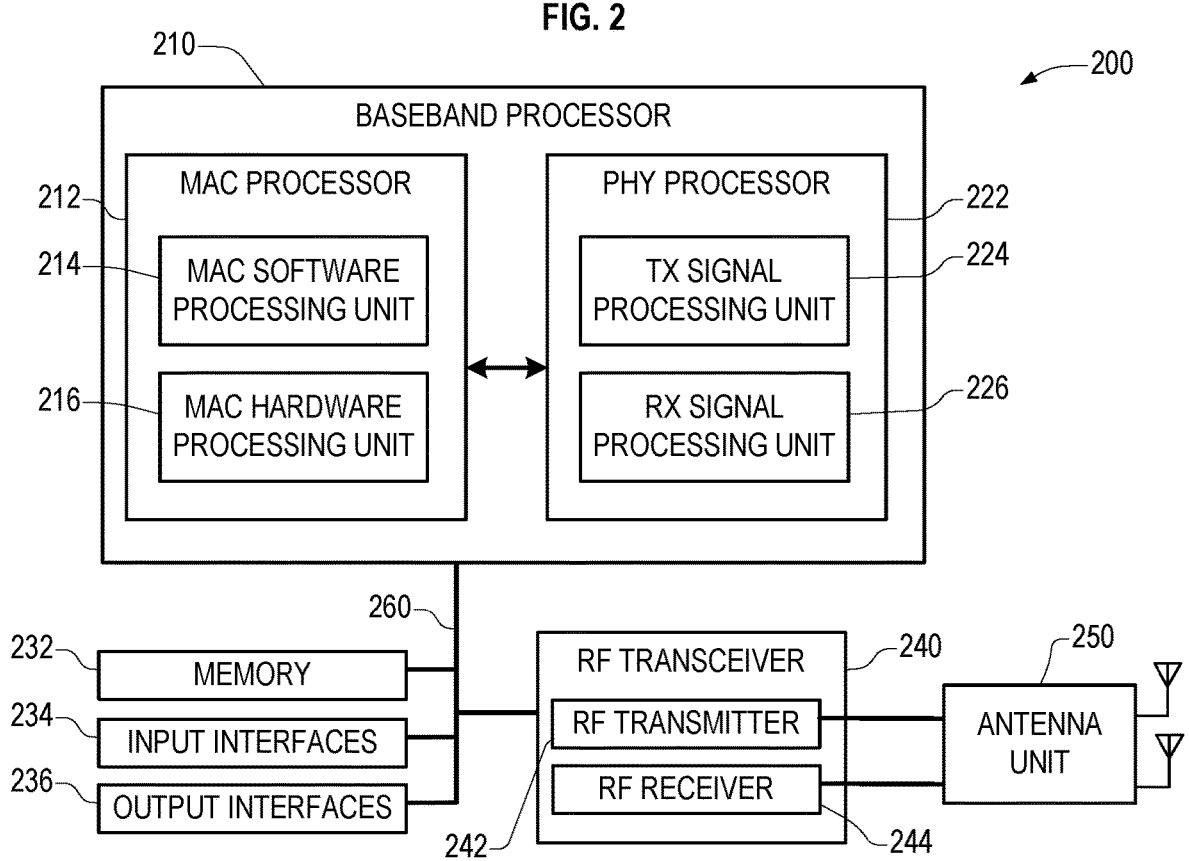
FIG. 2 is a schematic diagram of a wireless device, according to an embodiment.

FIG. 2 illustrates a schematic block diagram of a wireless device 200 according to an embodiment. The wireless or WLAN device 200 may be included in the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the memory 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the memory 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
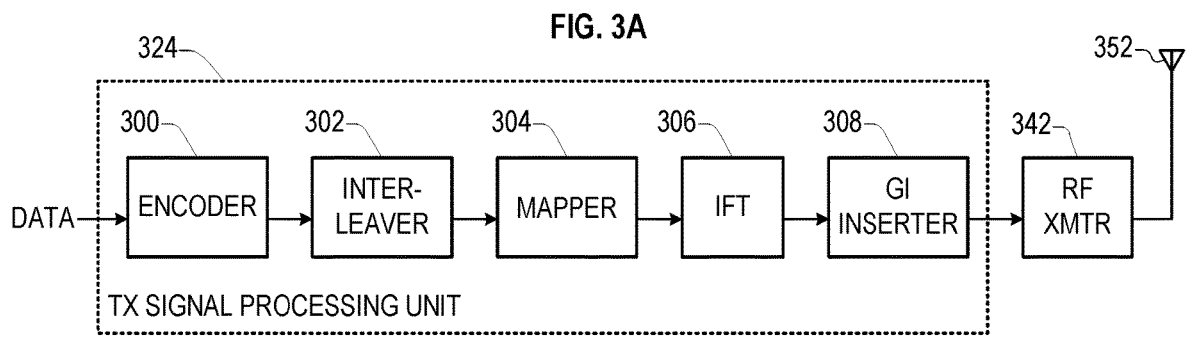
FIG. 3A illustrates components of a wireless device configured to transmit data, according to an embodiment.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
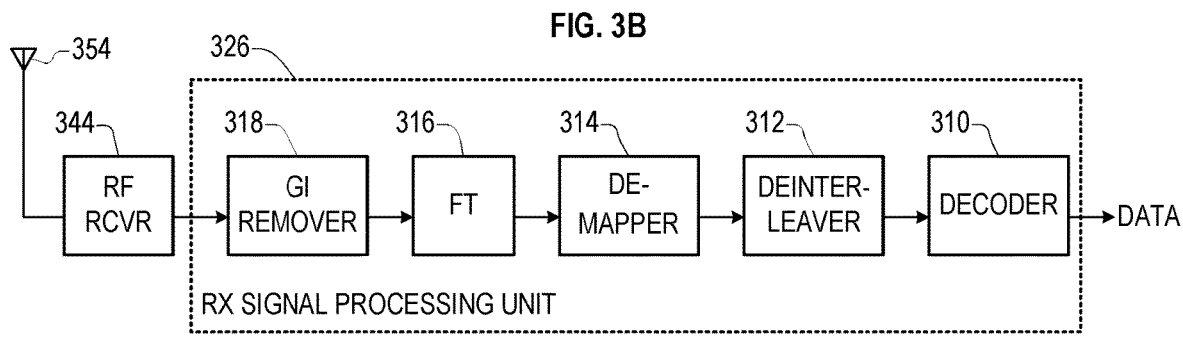
FIG. 3B illustrates components of a wireless device configured to receive data, according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving Physical Layer Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs.

Figure 4:
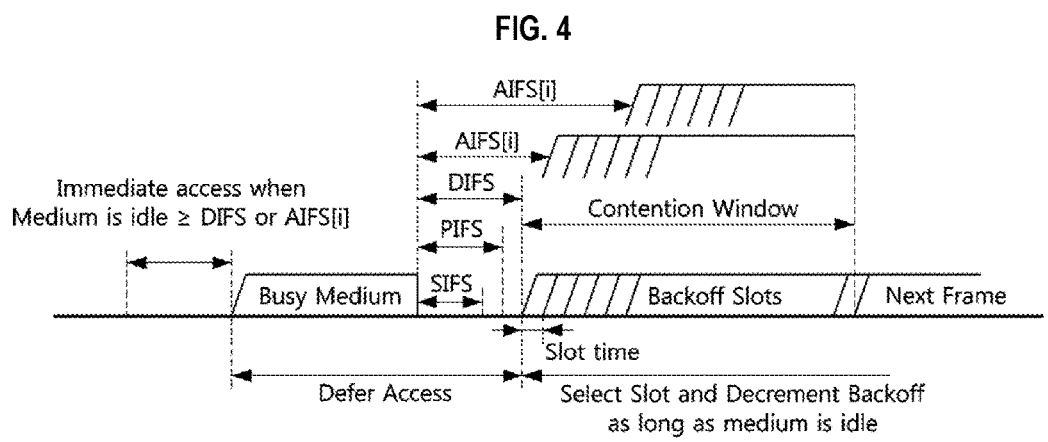
FIG. 4 illustrates Inter-Frame Space (IFS) relationships.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
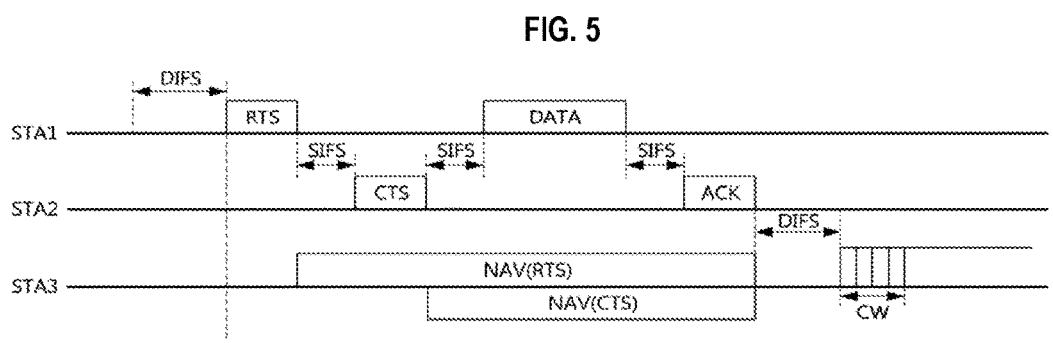
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an AP, the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+ SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

FIG. 5 shows the second station STA2 transmitting an ACK frame to acknowledge the successful reception of a frame by the recipient.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving PHY Protocol Data Units (PPDUs) that are compliant with the mandatory PHY specifications.

A PHY entity may provide support for 20 MHz, 40 MHz, 80 MHz, and 160 MHz contiguous channel widths and support for an 80+80 MHz non-contiguous channel width. Each channel includes a plurality of subcarriers, which may also be referred to as tones.

A PHY entity may define fields denoted as Legacy Signal (L-SIG), Signal A (SIG-A), and Signal B (SIG-B) within which some necessary information about PHY Service Data Unit (PSDU) attributes are communicated. For example, a High Efficiency (HE) PHY entity may define an L-SIG field, an HE Signal A (HE-SIG-A) field, and an HE Signal B (HE-SIG-B) field.

The descriptions below, for sake of completeness and brevity, refer to OFDM-based 802.11 technology. Unless otherwise indicated, a station refers to a non-AP HE STA, and an AP refers to an HE AP.

In the IEEE Std 802.11ac, SIG-A and SIG-B fields are called VHT SIG-A and VHT SIG-B fields. Hereinafter, IEEE Std 802.11ax SIG-A and SIG-B fields are respectively referred to as HE-SIG-A and HE-SIG-B fields.

FIG. 6A illustrates an HE PPDU 600 according to an embodiment. A transmitting station generates the HE PPDU frame 600 and transmits it to one or more receiving stations. The receiving stations receive, detect, and process the HE PPDU frame 600.

The HE PPDU frame 600 includes a Legacy Short Training Field (L-STF) 602, a Legacy (i.e., a Non-High Throughput (Non-HT)) Long Training Field (L-LTF) 604, a Legacy Signal (L-SIG) field 606, which together comprise a legacy preamble 601 and a Repeated L-SIG field (RL-SIG) 608. The L-STF 604 of the HE PPDU has a periodicity of 0.8 µs with 10 periods.

The HE PPDU frame 600 also includes an HE Signal A (HE-SIG-A) field 610, an HE Signal B (HE-SIG-B) field 612, an HE-STF 614, an HE-LTF 616, and an HE-Data field 618. In an embodiment, the HE PPDU frame 600 includes a plurality of HE-SIG-B fields 612 corresponding to different channels, and respective pluralities of HE-STFs 614, HE-LTFs 616, and HE-Data fields 618 corresponding to different channels or resource units.

The legacy preamble 601, the RL-SIG field 608, the HE-SIG-A field 610, and the HE-SIG-B field 612 when present, comprise a first part of the HE PPDU frame 600. In an embodiment, the first part of the HE PPDU frame 600 is decoded using a 64-element Discrete Fourier Transform (DFT), having a basic subcarrier spacing of 312.5 KHz.

The HE-SIG-A field 610 is duplicated on each 20 MHz segment after the legacy preamble to indicate common control information. The HE-SIG-A field 610 includes a plurality of OFDM HE-SIG-A symbols 620 each having a duration (including a Guard Interval (GI)) of 4 µs. A number of the HE-SIG-A symbols 620 in the HE-SIG-A field 610 is determined as either 2 or 4 depending on a type of the HE PPDU 600. In an embodiment, an HE-SIG-A field 610 of an HE Extended Range Single User (SU) PPDU include 4 HE-SIG-A symbols 620, and HE-SIG-A fields 610 of other types of HE PPDU include 2 HE-SIG-A symbols 620.

The HE-SIG-B field 612 is included in HE Multi-User (MU) PPDU(s). The HE-SIG-B field 612 includes a plurality of OFDM HE-SIG-B symbols 622 each having a duration including a GI of 4 µs. In embodiments, one or more of HE SU PPDUs, HE Tigger-based PPDUs, and HE Extended Range SU PPDUs do not include the HE-SIG-B field 612. A number of the HE-SIG-B symbols 622 in the HE-SIG-B field 612 is indicated by $N_{HE-SIGB}$ in the HE-SIG-A field 610 and is variable.

When the HE PPDU 600 has a bandwidth of 40 MHz or more, the HE-SIG-B field 612 may be transmitted in first and second HE-SIG-B channels 1 and 2. The HE-SIG-B field in the HE-SIG-B channel 1 is referred to as the HE-SIG-B1 field, and the HE-SIG-B field in the HE-SIG-B channel 2 is referred to as the HE-SIG-B2 field. The HE-SIG-B1 field and the HE-SIG-B2 field are communicated using different 20 MHz bandwidths of the HE PPDU 600, and may contain different information. Within this document, the term "HE-SIG-B field" may refer to an HE-SIG-B field of a 20 MHz PPDU, or to either or both of an HE-SIG-B1 field or HE-SIG-B2 field of a 40 MHz or more PPDU.

An HE-STF 614 of a non-trigger-based PPDU has a periodicity of 0.8 µs with 5 periods. A non-trigger-based PPDU is a PPDU that is not sent in response to a trigger frame. An HE-STF 614 of a trigger-based PPDU has a periodicity of 1.6 µs with 5 periods. Trigger-based PPDUs include UL PPDUs sent in response to respective trigger frames.

The HE-LTF 616 includes one or more OFDM HE-LTF symbols 626 each having a duration of 12.8 µs plus a Guard Interval (GI). The HE PPDU frame 600 may support a 2×LTF mode and a 4×LTF mode. In the 2×LTF mode, an HE-LTF symbol 626 excluding a Guard Interval (GI) is equivalent to modulating every other tone in an OFDM symbol of 12.8 µs excluding the GI, and then removing the second half of the OFDM symbol in a time domain. A number of the HE-LTF symbols 626 in the HE-LTF field 616 is indicated by $N_{HE-LTF}$, and is equal to 1, 2, 4, 6, or 8.

The HE-Data field 618 includes one or more OFDM HE-Data symbols 628 each having a duration of 12.8 µs plus a Guard Interval (GI). A number of the HE-Data symbols 628 in the HE-Data field 618 is indicated by NDATA and is variable.

FIG. 6B shows a Table 1 indicating additional properties of the fields of the HE PPDU frame 600 of FIG. 6A, according to an embodiment.

The descriptions below, for sake of completeness and brevity, refer to OFDMA-based 802.11 technology. Unless otherwise indicated, a station refers to a non-AP HE STA, and an AP refers to an HE AP.

A SIFS time interval which is used to send responses to received frames and to transmit multiple frames within a transmit opportunity (TXOP) duration is defined differently for stations operating in a 2.4 GHz band and a 5 GHz band. In a 2.4 GHz band, the SIFS interval for Non-HT and HT PPDUs is 10 µs. In a 5 GHz band, the SIFS interval for Non-HT, HT, and VHT PPDU is 16 µs. Note that VHT PPDUs are not transmitted on the 2.4 GHz band.

Because the required baseband processing time for a frame does not change with respect to operating carrier frequency (that is, a frame transmitted on the 2.4 GHz band takes the same baseband processing time when transmitted on the 5 GHz band), an additional time extension may be added after the end of the frame to lengthen the interval between two consecutive frames when the frames are transmitted on the 2.4 GHz band. This time extension is denoted as a signal extension.

For Non-HT and HT PPDU operating in the 2.4 GHz, 6 µs of signal extension, $T_{SE}$, is added to the end of the frame. After the signal extensions of $T_{SE}$=6 µs, the SIFS interval begins. That is, after a Non-HT station or HT station detects the end of a transmission on a shared wireless medium, the Non-HT station or HT station waits 6 µs before beginning the SIFS interval. This allows Non-HT and HT PPDUs to have the same processing time regardless whether the STA is operating in 2.4 GHz or 5 GHz.

An HE PPDU can be sent in the 2.4 GHz or the 5 GHz operation bands. However, as of this writing, an HE station receiving an HE PPDU in a 2.4 GHz band does not currently add a signal extension after detecting the end of the HE PPDU. If the same SIFS 10 µs SIFS interval is used for the HE PPDU in the 2.4 GHz band, this would result HE stations be able to have shorter time spacing between HE PPDUs compared to Non-HT and HT stations and compared to Non-HT and HT PPDUs.

Embodiments address issues related to differences in time spacing between HE PPDUs and non-HE PPDUs in a 2.4 GHz channel, and to differences in time spacings between HE and non-HE stations receiving HE PPDUs in the 2.4 GHz channel. Embodiment may have different definitions of a transmission time TXTIME for the HE PPDU depending on whether a station is HE capable or not.

Embodiments include an Option A in which, in the 2.4 GHz band, a length of an SIFS interval after an HE PPDU is changed and, in embodiments, a time gap is added to the HE PPDU.

Embodiments include an Option B in which, in the 2.4 GHz band, a length of the SIFS interval after an HE PPDU is not changed and a time gap and a signal extension are added to the HE PPDU.

Embodiments include an Option C in which, in the 2.4 GHz band, a length of the SIFS interval after an HE PPDU is not changed and the Packet Extension length is extended to include the Gap Time and also to be 6 µs longer.

Embodiments include an Option D in which, in the 2.4 GHz band, a length of the SIFS interval after an HE PPDU is not changed and a signal extension is added to the HE PPDU.

FIG. 7 includes a Table 2 that defines timing-related parameters for HE PPDU formats. Parameters defined include an IDFT/DFT period for pre-HE modulated fields $T_{DFT,Pre-HE}$, an IDFT/DFT period for an HE Data field $T_{DFT,HE}$, a Guard Interval (GI) duration for a legacy preamble, RL-SIG field, HE-SIG-A field, and HE-SIG-B field $T_{GI,pre-HE}$, a GI duration for HE-LTF $T_{GI,HE-LTF}$, a GI duration for an HE-Data field $T_{GI,Data}$, a Base GI duration for the HE-Data field $T_{GI1,Data}$, a Double GI duration for the HE-Data field $T_{GI2,Data}$, a Quadruple GI duration for the HE-Data field $T_{GI4,Data}$, an OFDM symbol duration with base GI $T_{SYM1}$, an OFDM symbol duration with double GI $T_{SYM2}$, an OFDM symbol duration with quadruple GI $T_{SYM4}$, a Symbol interval of Data symbols $T_{SYM}$, a Non-HT Short Training Field (STF) duration $T_{L-STF}$, a Non-HT Long Training Field (LTF) duration $T_{L-LTF}$, an Non-HT SIGNAL field duration $T_{L-SIG}$, a Repeated non-HT SIGNAL field duration $T_{RL-SIG}$, an HE-SIG-A field duration in an HE SU PPDU, HE MU PPDU, or HE trigger-based PPDU $T_{HE-SIG-A}$, an HE-SIG-A field duration in an HE extended range SU PPDU $T_{HE-SIG-A-R}$, an HE-STF duration for an HE trigger-based PPDU $T_{HE-STF-T}$, an HE-STF field duration for an HE SU PPDU, HE extended range SU PPDU or HE_MU PPDU $T_{HE-STF-NT}$, a Duration of each 1× HE-LTF OFDM symbol without GI $T_{HE-LTF-1X}$, a Duration of each 2× HE-LTF OFDM symbol without GI $T_{HE-LTF-2X}$, a Duration of each 4× HE-LTF OFDM symbol without GI $T_{HE-LTF-4X}$, a Duration of each OFDM symbol without GI in the HE-LTF field $T_{HE-LTF}$, a Duration of each OFDM symbol including GI in the HE-LTF field $T_{HE-LTF-SYM}$, a Duration of each OFDM symbol in the HE-SIG-B field $T_{HE-SIG-B}$, a Number of bits in SERVICE field $N_{service}$, a Number of tail bits per BCC encoder $N_{tail}$, a Symbol duration including GI prior to an HE-STF $T_{SYML}$, and a Duration of Packet Extension field $T_{PE}$.

A HE PPDU may have a Packet Extension (PE) appended at the end of the PPDU, with possible durations being 0 µs, 4 µs, 8 µs, 12 µs, or 16 µs. The PE, when present, shall be transmitted with the same average power as the Data field, and its content may be arbitrary.

The PE provides the recipient of the PPDU with additional processing time at the end of an HE PPDU, and its duration is determined by both the a-factor (i.e., the pre-FEC padding factor) value in the last OFDM symbol(s) of the Data field, the maximum PE duration requested by the recipient for the signal bandwidth (or Resource Unit (RU) size), the number of spatial streams, and the constellation size of the current PPDU, which is based on the Maximum PE capabilities as defined in an HE Capabilities field.

For an HE PPDU, the maximum PE durations as defined by the Maximum PE capabilities in a HE device are 0 µs, 8 µs, and 16 µs.

A 0 µs maximum PE duration means no PE is present.

An 8 µs maximum PE duration means that for an a-factor value of 1, 2, 3, or 4, a PE of 0 µs, 0 µs, 4 µs, or 8 µs, respectively, is appended at the end of the PPDU.

A 16 µs maximum PE duration means that for an a-factor value of 1, 2, 3, or 4, a PE of 4 µs, 8 µs, 12 µs, or 16 µs, respectively, is appended at the end of the PPDU.

For an HE_MU PPDU, the AP computes the PE duration, $T_{PE,u}$, for each user u, according to the common a-factor value among all users, the Maximum PE Duration capabilities, the RU size, the number of spatial streams, and constellation size for the user u. The AP shall choose the largest PE duration among all the users as the common PE duration of the current HE_MU PPDU as $T_{PE}=\max_u (T_{PE,u})$ and then append the PE at the end of the current HE_MU PPDU, with duration $T_{PE}$.

For an HE trigger-based PPDU, the AP indicates the common PE duration, $T_{PE}$, for all the users in the Trigger frame. Each user, when responding to the Trigger frame with an HE trigger-based PPDU, shall append a PE at the end of the current HE trigger-based PPDU, with a duration $T_{PE}$. During the duration of $T_{PE}$, the station shall transmit signal with equal transmit power as rest of the PPDU. This helps 3rd party stations performing carrier sensing of the medium detect energy during this time and aid in preventing a transition into a carrier lost receive state.

FIG. 8 includes a Table 3 showing a 3-bit Packet Extension field in an HE-SIG-A field of an HE PPDU, according to an embodiment. The Packet Extension field includes two bits for indicating the a-factor value and one PE Disambiguity bit.

The number $N_{SYM}$ of OFDM symbols in the Data field of an HE PPDU may be calculated as follows.

For an HE NDP PPDU, there is no Data field and NSYM=0.

For an HE SU or HE extended range SU PPDU using BCC encoding, the total number $N_{SYM}$ of OFDM symbols in the Data field is given by:

$$N_{SYM} = m_{STBC} \left\lceil \frac{8 \times \text{APEP\_LENGTH} + N_{SERVICE} + N_{TAIL}}{m_{STBC} \times N_{DBPS}} \right\rceil \quad \text{Eq. 1}$$

where $m_{STBC}$ is equal to 2 when STBC is used, and 1 otherwise; $N_{SERVICE}$ and $N_{TAIL}$ are defined in Table 2 of FIG. 7; APEP_LENGTH is the value of the APEP_LENGTH parameter of a TXVECTOR; and $N_{DBPS}$ is a number of data bits per symbol. The APEP_LENGTH may indicate a number of octets in the Aggregate MAC Protocol Data Unit (A-MPDU) pre-EOF padding carried in the PHY Service Data Unit (PSDU).

For an HE SU or HE extended range SU PPDU using LDPC encoding, the total number of OFDM symbols in the Data field, $N_{SYM}$, is given by:

$$N_{SYM} = \begin{cases} m_{STBC} \left\lceil \dfrac{8 \times APEP_{LENGTH} + N_{SERVICE}}{m_{STBC} \times N_{DBPS}} \right\rceil + m_{STBC}, & \begin{array}{l}\text{if extra } LDPC \\ \text{symbol required} \\ \text{and } a = 4\end{array} \\ m_{STBC} \left\lceil \dfrac{8 \times APEP_{LENGTH} + N_{SERVICE}}{m_{STBC} \times N_{DBPS}} \right\rceil, & \text{otherwise} \end{cases} \quad \text{Eq. 2}$$

where 'a' is the a-factor computed under the assumption that an extra LDPC symbol is not required. If an extra LDPC symbol is required, the a-factor is updated to 'new a-factor' equal to ('old a-factor' mod 4)+1.

For an HE_MU or HE trigger-based PPDU (including both MU-MIMO and OFDMA PPDU and PPDUs that use both MU-MIMO and OFDMA), the total number of OFDM symbols in the Data field, $N_{SYM}$, is determined by the largest number of OFDMA symbols required by allocated users.

FIGS. 9A and 9B shows an example of different interframe time interval between HE PPDUs and Non-HT and HT PPDUs.

A SIFS time interval which is used to send responses to received frames and to transmit multiple frames within a transmit opportunity (TXOP) duration is defined differently for STAs operating in a 2.4 GHz band and a 5 GHz band. In the 2.4 GHz band, the SIFS interval for Non-HT and HT PPDUs are 10 μs.

In the 5 GHz band, the SIFS interval for Non-HT, HT, VHT, and HE PPDUs are 16 μs. Thus, as shown in FIG. 9A, in the 5 GHz band, the respective spacings between a HT or VHT frame 902-5 and a subsequent non-HT frame 904-5, the non-HT frame 904-5 and a subsequent first HE frame 906-5, and the first HE frame 906-5 and a subsequent second HE frame 908-5 are all the same.

Since the required baseband processing time for a frame does not change with respect to operating carrier frequency (that is, with respect to which of the 2.4 and 5 GHz bands is used), additional time extension is added after the end of frames to lengthen the interval between two consecutive frames. This time extension is denoted as a signal extension, represents a period of subsequent non-transmission (that is, zero power transmitted into the medium) by a device performing a transmission, and in embodiments is implemented by adding the duration of the signal extension to a transmission time TXTIME computed for the transmission.

For Non-HT and HT PPDU being transmitted in a 2.4 GHz band, 6 μs of signal extension, $T_{SE}$, is added to the end of the frame. After the duration $T_{SE}$ of the signal extension elapses after reception of the frame, a SIFS interval begins. This allows Non-HT and HT PPDUs being received by a station to have the same processing time regardless whether the station is operating in the 2.4 GHz band or the 5 GHz band.

An HE PPDU can be sent in either of a 2.4 GHz or a 5 GHz operation band. However, an HE station according to the current draft of the standard at this writing does not add a signal extension to an HE PPDU being transmitted in the 2.4 GHz band. If the same SIFS interval is used for HE PPDU in 2.4 GHz, this would result in shorter time spacing between HE PPDUs compared to Non-HT and HT PPDUs.

As a result, as shown in FIG. 9B, at the time of this writing, in the 2.4 GHz band the spacings after an HT frame 902-24 and after a non-HT frame 904-24 would not be the same as the spacing after a first HE frame 906-24 and a subsequent second HE frame 908-24 because the transmission time TXTIME determined for the first HE frame 906-24 would not include the duration $T_{SE}$ of the signal extension.

In an embodiment, the SIFS duration used by an HE station after an HE PPDUs is always 16 μs, regardless of whether a station is operating in a 2.4 GHz band or a 5 GHz band. The SIFS duration will be different based on which PPDU has been transmitted or received prior to the SIFS duration.

Embodiments under Option A, when operating in a 2.4 GHz band, change a length of an SIFS interval after an HE PPDU and may add a time gap to the HE PPDU.

FIG. 10 shows an example of such operation. An Rx Node that is an HE STA will wait for a signal extension of 6 μs and a SIFS interval of 10 μs after an HT PPDU 1002 or a Non-HT PPDU 1004 is transmitted or received. The Rx Node that is an HE STA will wait for a SIFS interval of 16 μs after an HE PPDU 1006 is transmitted or received, without use of any signal extension time. The difference is that a signal extension is considered part of a frame, and included in the frames TXTIME determination, whereas a SIFS duration is not.

Figure 11:
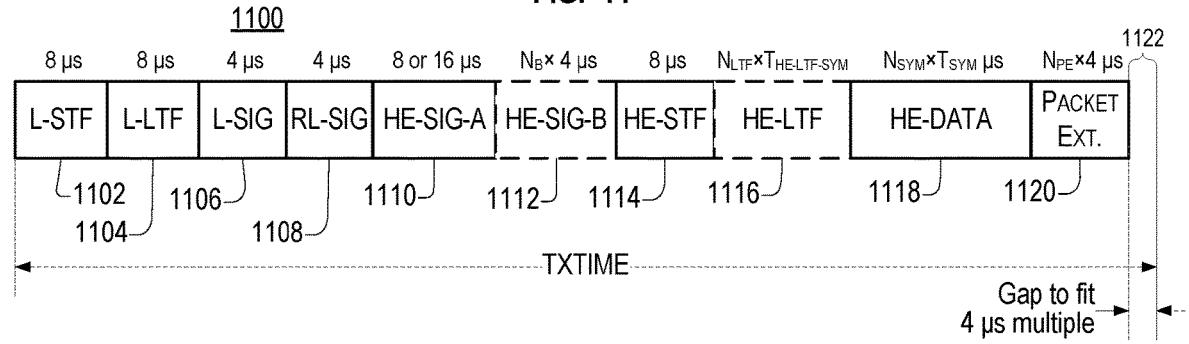
FIG. 11 illustrates an HE PPDU having a packet extension and gap time, according to an embodiment.

In an embodiment, a gap time is added after a packet extension of an HE PPDU. FIG. 11 illustrates such an embodiment.

FIG. 11 illustrates an HE PPDU 1100 having a gap time, according to an embodiment. The HE PPDU 1100 includes a Legacy Short Training Field (L-STF) 1102, a Legacy Long Training Field (L-LTF) 1104, a Legacy Signal (L-SIG) field 1106, and a Repeated L-SIG field (RL-SIG) 1108. The HE PPDU frame 1100 also includes an HE-SIG-A field 1110, an optional HE-SIG-B field 1112, an HE-STF 1114, an HE-LTF 1116, and an HE-Data field 1118. These fields are as described for the corresponding fields in FIG. 6.

The HE PPDU 1100 further includes a Packet Extension 1120 containing arbitrary content and transmitted at a same average power level as the rest of the HE PPDU 1100.

The total length of the meaningful signal portion of an HE PPDU may not always be an integer multiple of 4 μs. This is primarily due to the 12.8 μs data OFDM symbol duration and the various Guard Interval (i.e. cyclic prefix) times used in HE PPDUs. In particular, the symbols of the HE-LTF 1116 and the symbols of the HE-Data field 1118 may each have durations that are not integer multiples of 4 μs.

All non-HT, HT, and VHT frames operating in a 2.4 GHz band (or in a 5 GHz band) have a transmission time TXTIME (PPDU duration) in units of 4 μs (excluding any signal extension time). In this embodiment, the HE PPDU TXTIME (excluding any signal extension time) is also an integer multiple of 4 μs. This allows all stations (including non-HE stations, that is, non-HT, HT, and VHT stations) to determine exactly the same TXTIME for a received HE PPDU.

When the HE PPDU 1100 is received by an HE station, the HE station determines that the received frame is an HE PPDU and therefore has exact knowledge of the TXTIME associated with the HE PPDU 1100, which may not be a multiple of 4 μs. When the HE PPDU 1100 is received by a non-HE station, the non-HE station may determine that the HE PPDU 1100 is one of the legacy frame formats. However, the TXTIME computed by non-HE station may always be an integer multiple of 4 μs. As a result, the TXTIME computed by a HE stations may differ from the TXTIME computed by non-HE stations. This can lead to unfairness in medium access between the stations.

In order to mitigate this problem, this embodiment adds a small time gap 1122 after the packet extension that allows the total duration of the HE PPDU 1100 to be integer multiple of 4 μs, as shown in FIG. 11.

The change in the TXTIME duration for the HE PPDU 1100 requires changes in the equations for deriving packet extension length dis-ambiguity. The packet extension length dis-ambiguity is used to identify whether the last potential OFDM symbol is part of the packet extension or a regular data OFDM symbol. In an embodiment, the last potential OFDM symbol of the HE PPDU 1100 is part of the packet extension (and a PE Disambiguity bit in the HE-SIG-A is set to 1 to indicate such to receiving stations) when the following condition is met:

$$T_{PE} + \left(4\left\lceil\frac{X}{4}\right\rceil - (X)\right) \geq T_{SYM}, \quad X = T_{HE-PREAMBLE} + N_{SYM}T_{SYM} \quad \text{Eq. 3}$$

wherein $T_{PE}$ is the duration of a Packet Extension (PE) 1120, $T_{HE-PREAMBLE}$ is the duration of an HE preamble of the HE PPDU 1100, $N_{SYM}$ is the number of symbols in the HE-Data field 1118, and $T_{SYM}$ is the duration of a symbol of the HE-Data field 1118.

In another embodiment, the last potential OFDM symbol of the HE PPDU 1100 is a part of the packet extension (and the PE Disambiguity bit is set to 1 to indicate such to receiving stations) when the following condition is met:

$$T_{PE} + \left(4\left\lceil\frac{X}{4}\right\rceil - (X)\right) \geq T_{SYM}, \quad \text{Eq. 4}$$
$$X = N_{HE-LTF}T_{HE-LTF-SYM} + N_{SYM}T_{SYM}$$

wherein $N_{HE-LTF}$ is a number of symbols in the HE-LTF 1116.

In another embodiment, the last potential OFDM symbol of the HE PPDU 1100 is a part of the packet extension (and the PE Disambiguity bit is set to 1 to indicate such to receiving stations) when the following condition is met:

$$T_{PE} + \left(4\left\lceil\frac{X}{4}\right\rceil - (X)\right) \geq T_{SYM}, \quad \text{Eq. 5}$$
$$X = T_{LEG-PREAMBLE} + T_{HE-PREAMBLE} + N_{SYM}T_{SYM}$$

wherein $T_{LEG-PREAMBLE}$ is a duration of the legacy preamble of the HE PPDU 1100.

Based on a PE disambiguity field and an a-factor field of a PE of an HE-SIG-A field of the HE PPDU 1100, a station receiving the HE PPDU 1100 shall compute the number of symbols $N_{SYM}$ in the HE-Data field 1118 and the duration $T_{PE}$ of the Packet Extension.

In an embodiment, the TXTIME calculation for the HE PPDU is updated to take into account the time gap added at the end of HE PPDU.

When an HE PPDU is an HE SU PPDU and HE trigger-based PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + \quad \text{Eq. 6}$$
$$T_{HE-SIG-A} + 4\left\lceil\frac{T_{HE-PREAMBLE} + N_{SYM}T_{SYM}}{4}\right\rceil + T_{PE}$$

When the HE PPDU is an HE_MU PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + T_{HE-SIG-A} + \quad \text{Eq. 7}$$
$$N_{HE-SIG-B}T_{HE-SIG-B} + 4\left\lceil\frac{T_{HE-PREAMBLE} + N_{SYM}T_{SYM}}{4}\right\rceil + T_{PE}$$

When the HE PPDU is an HE extended range SU PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + \quad \text{Eq. 8}$$
$$T_{HE-SIG-A}T_{HE-SIG-A-E} + 4\left\lceil\frac{T_{HE-PREAMBLE} + N_{SYM}T_{SYM}}{4}\right\rceil + T_{PE}$$

In the equations, a $T_{LEG-PREAMBLE}$ is equal to $T_{L-STF} + T_{L-LTF}$ and $T_{HE-PREAMBLE}$ is equal to $T_{HE-STF-T} + N_{HE-LTF}T_{HE-LTF-SYM}$ when the HE PPDU is an HE trigger-based PPDU and to $T_{HE-STF-NT} + N_{HE-LTF}T_{HE-LTF-SYM}$ otherwise. Table 2, Timing Related Constants, of FIG. 7 provides definitions for $T_{L-STF}$, $T_{L-LTF}$, $T_{HE-STF-T}$, $T_{HE-STF-NT}$, $T_{HE-LTF-SYM}$, $T_{L-SIG}$, $T_{RL-SIG}$, $T_{HE-SIG-A}$, $T_{HE-SIG-A-R}$, $T_{HE-SIG-B}$, and $T_{SYM}$. $N_{HE-SIG-B}$ and $N_{HE-LTF}$ are indicated by signaling in an HE-SIG-A field of the HE-PPDU. $T_{PE}$ is the packet extension duration.

An L_LENGTH field of the L-SIG field of the HE PPDU is computed based on the following equation. The L-SIG field is used to communicate rate and length information. In an HE PPDU, the RATE field shall be set to the value representing 6 Mb/s. The LENGTH field shall be set to the value given by|

$$\text{L\_LENGTH} = \left\lceil\frac{TXTIME - 20}{4}\right\rceil \times 3 - 3 - m \quad \text{Eq. 9}$$

Or equivalently (when TXTIME is always given in units of 4 μs):

$$\text{L\_LENGTH} = \left(\frac{TXTIME - 20}{4}\right) \times 3 - 3 - m \quad \text{Eq. 10}$$

where TXTIME (in μs) is defined in the TXTIME and PSDU_LENGTH calculation, and m is one when the HE PPDU is an HE_MU PPDU or an HE extended range SU PPDU and is two otherwise.

$T_{SE}$ is 0 μs when a station is operating in a 5 GHz band, and 6 μs when the stations is operating in a 2.4 GHz band.

Figure 12:
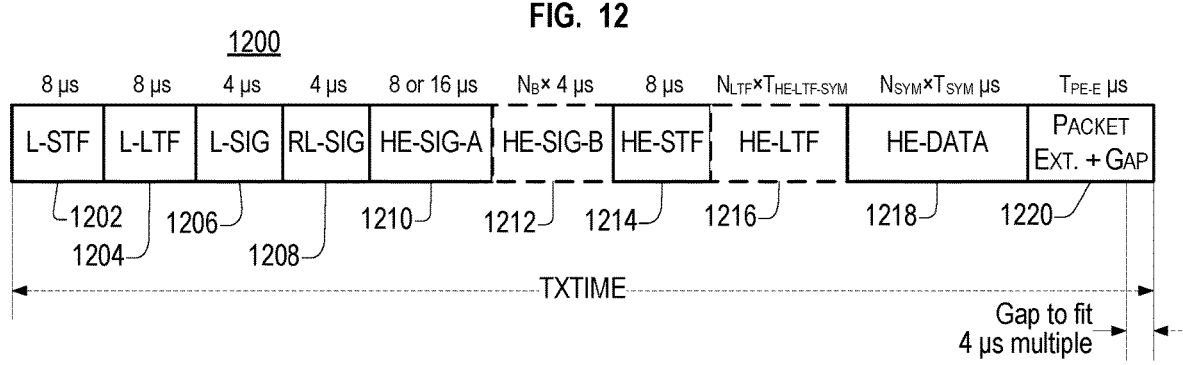
FIG. 12 illustrates an HE PPDU having a packet extension extended by a gap time, according to an embodiment.

In an embodiment, the packet extension duration is extended by a small time gap that allows the total HE PPDU duration to be integer multiple of 4 μs, as shown in FIG. 12. The HE PPDU 1200 of FIG. 12 includes a Legacy Short Training Field (L-STF) 1202, a Legacy Long Training Field (L-LTF) 1204, a Legacy Signal (L-SIG) field 1206, and a Repeated L-SIG field (RL-SIG) 1208. The HE PPDU frame 1200 also includes an HE-SIG-A field 1210, an optional HE-SIG-B field 1212, an HE-STF 1214, an HE-LTF 1216, and an HE-Data field 1218. These fields are as described for the corresponding fields in FIG. 6.

The HE PPDU 1200 further includes a Packet Extension 1220 containing arbitrary content and transmitted at a same average power level as the rest of the HE PPDU 1200. The Packet Extension 1220 includes a time gap, and a duration of the Packet Extension 1220 is denoted as $T_{PE-E}$.

The difference between a time gap shown in the embodiment of FIG. 11 and the extended packet extension 1220 shown in the embodiment of FIG. 12 is that a station transmits energy during the time gap in the extended packet extension 1220 and does not transmit energy during the time gap 1122 of FIG. 11. In the embodiment of FIG. 12, a station shall transmit a non-zero power during the time gap, ideally with the same transmit power as the rest of HE PPDU. This allows 3rd party stations to detect even the time gap during carrier sensing.

The change in the TXTIME duration for the HE PPDU 1200 requires changes in the equations for deriving packet extension length dis-ambiguity. The packet extension length dis-ambiguity is used to identify whether the last potential OFDM symbol is a packet extension of a regular data OFDM symbol. In an embodiment, the last potential OFDM symbol of the HE PPDU 1200 is packet extension (and a PE Disambiguity bit in the HE-SIG-A is set to 1 to indicate such to receiving stations) when the condition $T_{PE-E} \geq T_{SYM}$ is met, and otherwise the PE Disambiguity subfield shall be set to 0.

$T_{PE-E}$ is the extended PE duration and given by any one of:

$$T_{PE-E} = T_{PE} + \left(4\left\lceil \frac{X}{4} \right\rceil - (X)\right), \quad \text{Eq. 11}$$

$$X = N_{HE-LTF}T_{HE-LTF-SYM} + N_{SYM}T_{SYM}$$

$$T_{PE-E} = T_{PE} + \left(4\left\lceil \frac{X}{4} \right\rceil - (X)\right), \quad \text{Eq. 12}$$

$$X = T_{HE-PREAMBLE} + N_{SYM}T_{SYM}$$

$$T_{PE-E} = T_{PE} + \left(4\left\lceil \frac{X}{4} \right\rceil - (X)\right), \quad \text{Eq. 13}$$

$$X = T_{LEG-PREAMBLE} + T_{HE-PREAMBLE} + N_{SYM}T_{SYM}$$

Based on a PE disambiguity field and an a-factor field of a PE field of an HE-SIG-A field of the HE PPDU 1200, a station receiving the HE PPDU 1200 shall compute the number of symbols $N_{SYM}$ in the HE-Data field 1218 and the duration $T_{PE}$ of the Packet Extension.

In the embodiment, the TXTIME calculation for the HE PPDU 1200 is updated to take into account the extended packet extension by the time gap at the end of HE PPDU 1200. When an HE PPDU is an HE SU PPDU or HE trigger-based PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + \quad \text{Eq. 14}$$
$$T_{HE-SIG-A} + T_{HE-PREAMBLE} + N_{SYM}T_{SYM} + T_{PE-E}$$

When an HE PPDU is an HE_MU PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + T_{HE-SIG-A} + \quad \text{Eq. 15}$$
$$N_{HE-SIG-B}T_{HE-SIG-B} + T_{HE-PREAMBLE} + N_{SYM}T_{SYM} + T_{PE-E}$$

When an HE PPDU is an HE extended range SU PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + T_{HE-SIG-A} + \quad \text{Eq. 16}$$
$$T_{HE-SIG-A-E} + T_{HE-PREAMBLE} + N_{SYM}T_{SYM} + T_{PE-E}$$

In the equations, $T_{LEG-PREAMBLE}$ is equal to $T_{L-STF}+T_{L-LTF}$ and $T_{HE-PREAMBLE}$ is equal to $T_{HE-ST-T}+N_{HE-LTF}T_{HE-LTF-SYM}$ when the HE PPDU is an HE trigger-based PPDU and to $T_{HE-STF-NT}+N_{HE-LTF}T_{HE-LTF-SYM}$ otherwise. Table 2, Timing Related Constants, of FIG. 7 provides definitions for $T_{L-STF}$, $T_{L-LTF}$, $T_{HE-STF-T}$, $T_{HE-STF-NT}$, $T_{HE-LTF-SYM}$, $T_{L-SIG}$, $T_{RL-SIG}$, $T_{HE-SIG-A}$, $T_{HE-SIG-A-R}$, $T_{HE-SIG-B}$, and $T_{SYM}$. $N_{HE-SIG-B}$ and $N_{HE-LTF}$ are indicated signaling in an HE-SIG-A field of the HE-PPDU. $T_{PE-E}$ is the extended packet extension duration.

An L_LENGTH field of the L-SIG field of the HE PPDU 1200 is computed based on the following equation. The L-SIG field is used to communicate rate and length information. In an HE PPDU, the RATE field shall be set to the value representing 6 Mb/s. The LENGTH field shall be set to the value given by $$L\_LENGTH = \left\lceil \frac{TXTIME - 20}{4} \right\rceil \times 3 - 3 - m \quad \text{Eq. 17}$$

Or equivalently (when TXTIME is always given in units of 4 μs):

$$L\_LENGTH = \left(\frac{TXTIME - 20}{4}\right) \times 3 - 3 - m \quad \text{Eq. 18}$$

where TXTIME (in μs) is defined in the TXTIME and PSDU_LENGTH calculation, and m is one when the HE PPDU is an HE_MU PPDU or an HE extended range SU PPDU and is two otherwise.

Embodiments under Option B, when operating in a 2.4 GHz band, add a signal extension after an HE PPDU and may add a time gap to the HE PPDU.

Figure 13:
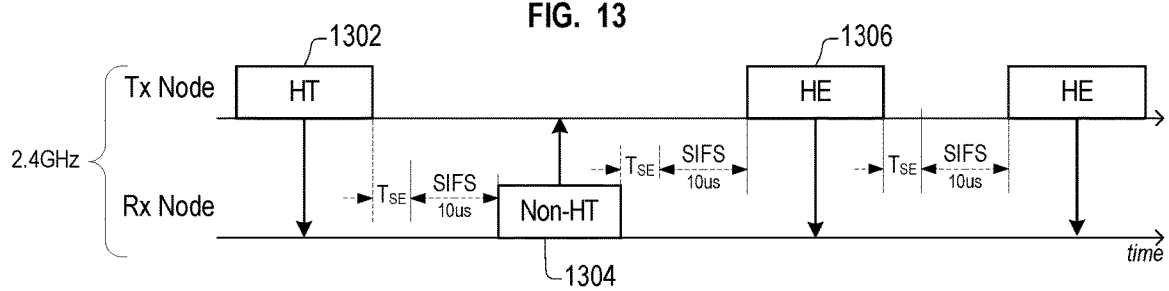
FIG. 13 illustrates inter-frame time intervals between Non-HT, HT, and HE PPDUs in a 2.4 GHz band, according to an embodiment.

FIG. 13 illustrates inter-frame time intervals between Non-HT, HT, and HE PPDUs in a 2.4 GHz band, according to an embodiment. In the embodiment of FIG. 13, a SIFS remains 10 μs and a Signal Extension and, in an embodiment, a Gap Time are added after HE PPDUs being transmitted in the 2.4 GHz band. As a result, a total inter-frame interval after an HE PPDUs is always 16 μs (i.e., a signal extension of 6 μs plus a SIFS of 10 μs in the 2.4 GHz band, and a SIFS of 16 μs in a 5 GHz band).

FIG. 13 shows that an Rx Node will wait for a signal extension of 6 μs and a SIFS interval of 10 μs after an HT PPDU 1302 or a Non-HT PPDU 1304. An Rx Node will wait for signal extension of 6 μs and a SIFS interval of 10 μs after a HE PPDU 1306.

Figure 14:
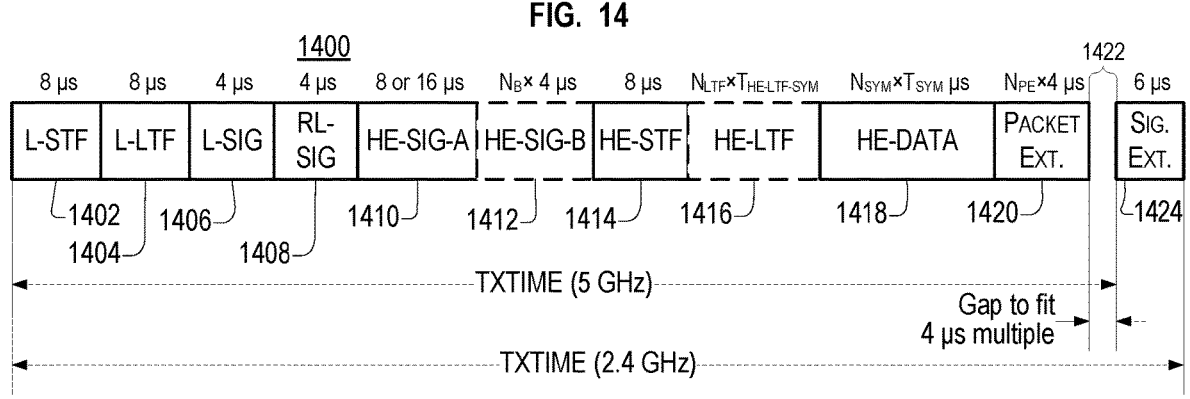
FIG. 14 illustrates an HE PPDU having a packet extension, a gap time, and a signal extension, according to an embodiment.

FIG. 14 illustrates an HE PPDU 1400 having a gap time, according to an embodiment. The HE PPDU 1400 includes a Legacy Short Training Field (L-STF) 1402, a Legacy Long Training Field (L-LTF) 1404, a Legacy Signal (L-SIG) field 1406, and a Repeated L-SIG field (RL-SIG) 1408. The HE PPDU frame 1400 also includes an HE-SIG-A field 1410, an optional HE-SIG-B field 1412, an HE-STF 1414, an HE-LTF 1416, and an HE-Data field 1418. These fields are as described for the corresponding fields in FIG. 6.

The HE PPDU 1400 further includes a Packet Extension 1420 containing arbitrary content and transmitted at a same average power level as the rest of the HE PPDU 1400, a gap 1422, and a signal extension 1424. During the signal extension 1424, no energy is transmitted into the channel by the station transmitting the HE PPDU 1400.

In an embodiment, because a total length of the meaningful signal portion of the HE PPDU may always not be integer multiple of 4 μs, as described with respect to FIG. 11, the gap 1422 may be added to make the HE PPDU effective duration (TXTIME–Signal Extension time) an integer multiple of 4 μs. This allows all stations (include non-HE stations) to determine exactly the same TXTIME for a frame of a received HE PPDU.

When an HE PPDU is received by an HE station, the HE station knows that the received frame is a HE PPDU and therefore has the exact knowledge of the TXTIME associated with it. When an HE PPDU is received by a non-HE station, the non-HE station may believe the HE PPDU is one of the legacy frame formats. However, if the TXTIME computed by legacy STAs is always an integer multiple of 4 μs, then computed TXTIME between HE-STAs and legacy STAs may be different. This can lead to unfairness in medium access between the STAs. Adding the gap 1422 mitigates this unfairness. The gap 1422 after the packet extension and before any signal extension allows the total HE PPDU duration minus the duration of the signal extension to be integer multiple of 4 μs.

The gap 1422 will be of sufficient time duration that a duration from the beginning of the L-STF 1402 to end of the gap 1422 shall be integer multiple of 4 μs.

The signal extension is 6 μs when the station is operating in a 2.4 GHz and 0 μs when the stations is operating in a 5 GHz band.

The change in the TXTIME duration for the HE PPDU 1400 requires changes in the equations for deriving packet extension length dis-ambiguity. The packet extension length dis-ambiguity is used to identify whether the last potential OFDM symbol is a packet extension of a regular data OFDM symbol.

In an embodiment, the last potential OFDM symbol of the HE PPDU 1400 is part of a packet extension (and a PE Disambiguity bit in the HE-SIG-A is set to 1 to indicate such to receiving stations) when the following condition is met:

$$T_{PE} + \left(4\left\lceil\frac{X}{4}\right\rceil - (X)\right) \geq T_{SYM}, X = T_{HE-PREAMBLE} + N_{SYM}T_{SYM} \quad \text{Eq. 19}$$

wherein $T_{PE}$ is the duration of a Packet Extension (PE) 1420, $T_{HE-PREAMBLE}$ is the duration of an HE preamble of the HE PPDU 1400, $N_{SYM}$ is the number of symbols in the HE-Data field 1418, and $T_{SYM}$ is the duration of a symbol of the HE-Data field 1418.

In another embodiment, the last potential OFDM symbol of the HE PPDU 1400 is part of the packet extension (and the PE Disambiguity bit is set to 1 to indicate such to receiving stations) when the following condition is met:

$$T_{PE} + \left(4\left\lceil\frac{X}{4}\right\rceil - (X)\right) \geq T_{SYM}, \quad \text{Eq. 20}$$

$$X = N_{HE-LTF}T_{HE-LTF-SYM} + N_{SYM}T_{SYM}$$

wherein $N_{HE-LTF}$ is a number of symbols in the HE-LTF 1416.

In another embodiment, the last potential OFDM symbol of the HE PPDU 1400 is part of the packet extension (and the PE Disambiguity bit is set to 1 to indicate such to receiving stations) when the following condition is met:

$$T_{PE} + \left(4\left\lceil\frac{X}{4}\right\rceil - (X)\right) \geq T_{SYM}, \quad \text{Eq. 21}$$

$$X = T_{LEG-PREAMBLE} + T_{HE-PREAMBLE} + N_{SYM}T_{SYM}$$

wherein $T_{LEG-PREAMBLE}$ is a duration of the legacy preamble of the HE PPDU 1400.

Based on a PE disambiguity field and an a-factor field of a PE field of an HE-SIG-A field 1410 of the HE PPDU 1400, a station receiving the HE PPDU 1400 shall compute the number of symbols $N_{SYM}$ in the HE-Data field 1418 and the duration $T_{PE}$ of the Packet Extension 1420.

In the embodiment, the TXTIME calculation for the HE PPDU is updated to take into account the extended packet extension by the time gap at the end of HE PPDU.

When an HE PPDU is an HE SU PPDU or HE trigger-based PPDU, the value of the TXTIME parameter returned by the PLME-TXTIME.confirm primitive shall be calculated for an HE PPDU using:

$$TXTIME = T_{LEG-PREAMBLE} + T_{L-SIG} + T_{RL-SIG} + \quad \text{Eq. 22}$$

$$T_{HE-SIG-A} + 4\left\lceil\frac{T_{HE-PREAMBLE} + N_{SYM}T_{SYM}}{4}\right\rceil + T_{PE} + T_{SE}$$

When an HE PPDU is an HE_MU PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + T_{HE-SIG-A} + \quad \text{Eq. 23}$$

$$N_{HE-SIG-B}T_{HE-SIG-B} + 4\left\lceil\frac{T_{HE-PREAMBLE} + N_{SYM}T_{SYM}}{4}\right\rceil + T_{PE} + T_{SE}$$

When an HE PPDU is an HE extended range SU PPDU, the value of the TXTIME parameter returned by the PLME-TXTIME.confirm primitive shall be calculated for the HE PPDU using:

$$TXTIME = \quad \text{Eq. 24}$$

$$T_{LEG-PREAMBLE} + T_{L-SIG} + T_{RL-SIG} + T_{HE-SIG-A} + T_{HE-SIG-A-E} +$$

$$4\left\lceil\frac{T_{HE-PREAMBLE} + N_{SYM}T_{SYM}}{4}\right\rceil + T_{PE} + T_{SE}$$

In the equations, $T_{LEG-PREAMBLE}$ is equal to $T_{L-STF}+T_{L-LTF}$ and $T_{HE-PREAMBLE}$ is equal to $T_{HE-ST-T}+N_{HE-LTF}T_{HE-LTF-SYM}$ when the HE PPDU is an HE trigger-based PPDU and to $T_{HE-STF-NT}+N_{HE-LTF}T_{HE-LTF-SYM}$ otherwise. Table 2, Timing Related Constants, of FIG. 7 provides definitions for $T_{L-STF}$, $T_{L-LTF}$, $T_{HE-STF-T}$, $T_{HE-STF-NT}$, $T_{HE-LTF-SYM}$, $T_{L-SIG}$, $T_{RL-SIG}$, $T_{HE-SIG-A}$, $T_{HE-SIG-A-R}$, $T_{HE-SIG-B}$, and $T_{SYM}$. $N_{HE-SIG-B}$ and $N_{HE-LTF}$ are indicated signaling in an HE-SIG-A field of the HE-PPDU. $T_{PE}$ is the packet extension duration. $T_{SE}$ is 0 μs when a station is operating in a 5 GHz band, and 6 μs when the station is operating in a 2.4 GHz band.

An L_LENGTH field of the L-SIG field of the HE PPDU 1400 is computed based on the following equation. The L-SIG field is used to communicate rate and length information. In an HE PPDU, the RATE field shall be set to the value representing 6 Mb/s. The $T_{SE}$=6 µs in the 2.4 GHz band is subtracted out during the L_LENGTH value calculation from the TXTIME of the HE PPDU. The LENGTH field shall be set to the value given by:

$$\text{L\_LENGTH} = \left\lceil \frac{TXTIME - T_{SE} - 20}{4} \right\rceil \times 3 - 3 - m \quad \text{Eq. 25}$$

Or equivalently (when TXTIME-$T_{SE}$ is always given in units of 4 µs):

$$\text{L\_LENGTH} = \left( \frac{TXTIME - T_{SE} - 20}{4} \right) \times 3 - 3 - m \quad \text{Eq. 26}$$

where TXTIME (in µs) is defined in the TXTIME and PSDU_LENGTH calculation, and m is one when the HE PPDU is an HE_MU PPDU or an HE extended range SU PPDU and is two otherwise. $T_{SE}$ is 0 µs when a station is operating in a 5 GHz band, and 6 µs when the station is operating in a 2.4 GHz band.

Figure 15:
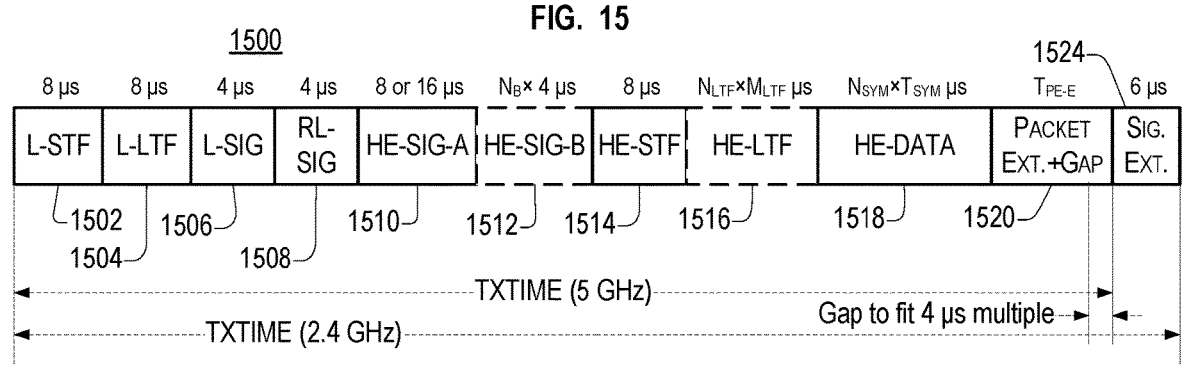
FIG. 15 illustrates an HE PPDU having a packet extension extended by a gap time and a signal extension, according to an embodiment.

FIG. 15 illustrates an HE PPDU 1500 having packet extension extended by a gap time and having a signal extension, according to an embodiment. In the HE PPDU 1500, packet extension duration is extended with a small time gap that allows the total duration of the HE PPDU 1500, exclusive of the signal extension, to be integer multiple of 4 µs. A packet extension duration of the extended packet extension is denoted as $T_{PE-E}$.

The HE PPDU 500 includes a Legacy Short Training Field (L-STF) 1502, a Legacy Long Training Field (L-LTF) 1504, a Legacy Signal (L-SIG) field 1506, and a Repeated L-SIG field (RL-SIG) 1508. The HE PPDU frame 1500 also includes an HE-SIG-A field 1510, an optional HE-SIG-B field 1512, an HE-STF 1514, an HE-LTF 1516, and an HE-Data field 1518. These fields are as described for the corresponding fields in FIG. 6.

The HE PPDU 1500 further includes a Packet Extension 1520 containing arbitrary content and transmitted at a same average power level as the rest of the HE PPDU 1500, and a signal extension 1524. During the signal extension 1524, no energy is transmitted by the station transmitting the HE PPDU 1500.

The change in the TXTIME duration for the HE PPDU 1500 requires changes in the equations for deriving packet extension length dis-ambiguity. The packet extension length dis-ambiguity is used to identify whether the last potential OFDM symbol is a packet extension of a regular data OFDM symbol. In an embodiment, the last potential OFDM symbol of the HE PPDU 1500 is part of a packet extension (and a PE Disambiguity bit in the HE-SIG-A is set to 1 to indicate such to receiving stations) when the condition $T_{PE-E} \geq T_{SYM}$ is met, and otherwise the PE Disambiguity subfield shall be set to 0.

$T_{PE-E}$ is the extended PE duration and given by any one of:

$$T_{PE-E} = T_{PE} + \left( 4 \left\lceil \frac{X}{4} \right\rceil - (X) \right), \quad \text{Eq. 27}$$

$$X = N_{HE-LTF} T_{HE-LTF-SYM} + N_{SYM} T_{SYM}$$

-continued $$T_{PE-E} = T_{PE} + \left( 4 \left\lceil \frac{X}{4} \right\rceil - (X) \right), X = T_{HE-PREAMBLE} + N_{SYM} T_{SYM} \quad \text{Eq. 28}$$

$$T_{PE-E} = T_{PE} + \left( 4 \left\lceil \frac{X}{4} \right\rceil - (X) \right), \quad \text{Eq. 29}$$

$$X = T_{LEG-PREAMBLE} + T_{HE-PREAMBLE} + N_{SYM} T_{SYM}$$

Based on a PE disambiguity field and an a-factor field of a PE field of an HE-SIG-A field of the HE PPDU 1500, a station receiving the HE PPDU 1500 shall compute the number of symbols $N_{SYM}$ in the HE-Data field 1518 and the duration $T_{PE}$ of the Packet Extension.

In the embodiment, the TXTIME calculation for the HE PPDU is updated to take into account the extended packet extension by the time gap at the end of HE PPDU.

When an HE PPDU is an HE SU PPDU or HE trigger-based PPDU, the value of the TXTIME parameter returned by the PLME-TXTIME.confirm primitive shall be calculated for an HE PPDU using:

$$TXTIME = T_{LEG-PREAMBLE} + T_{L-SIG} + T_{RL-SIG} + \quad \text{Eq. 30}$$

$$T_{HE-SIG-A} + T_{HE-PREAMBLE} + N_{SYM} T_{SYM} + T_{PE-E} + T_{SE}$$

When an HE PPDU is an HE_MU PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + T_{HE-SIG-A} + \quad \text{Eq. 31}$$

$$N_{HE-SIG-B} T_{HE-SIG-B} + T_{HE-PREAMBLE} + N_{SYM} T_{SYM} + T_{PE-E} + T_{SE}$$

When an HE PPDU is an HE extended range SU PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + T_{HE-SIG-A} + \quad \text{Eq. 32}$$

$$T_{HE-SIG-A-E} + T_{HE-PREAMBLE} + N_{SYM} T_{SYM} + T_{PE-E} + T_{SE}$$

In the equations, $T_{LEG-PREAMBLE}$ is equal to $T_{L-STF} + T_{L-LTF}$ and $T_{HE-PREAMBLE}$ is equal to $T_{HE-ST-T} + N_{HE-LTF} T_{HE-LTF-SYM}$ when the HE PPDU is an HE trigger-based PPDU and to $T_{HE-STF-NT} + N_{HE-LTF} T_{HE-LTF-SYM}$ otherwise. Table 2, Timing Related Constants, of FIG. 7 provides definitions for $T_{L-STF}$, $T_{L-LTF}$, $T_{HE-STF-T}$, $T_{HE-STF-NT}$, $T_{HE-LTF-SYM}$, $T_{L-SIG}$, $T_{RL-SIG}$, $T_{HE-SIG-A}$, $T_{HE-SIG-B}$, and $T_{SYM}$. $N_{HE-SIG-B}$ and $N_{HE-LTF}$ are indicated signaling in an HE-SIG-A field of the HE-PPDU. $T_{PE-E}$ is the extended packet extension duration, $T_{SE}$ is 0 µs when operating in a 5 GHz band and 6 µs when operating in a 2.4 GHz band.

An L_LENGTH field of the L-SIG field of the HE PPDU 1500 is computed based on the following equation. The L-SIG field is used to communicate rate and length information. In an HE PPDU, the RATE field shall be set to the value representing 6 Mb/s. The LENGTH field shall be set to the value given by|

$$\text{L\_LENGTH} = \left\lceil \frac{TXTIME - T_{SE} - 20}{4} \right\rceil \times 3 - 3 - m \quad \text{Eq. 33}$$

Or equivalently (when TXTIME is always given in units of 4 μs):

$$\text{L\_LENGTH} = \left(\frac{TXTIME - T_{SE} - 20}{4}\right) \times 3 - 3 - m \qquad \text{Eq. 34}$$

where TXTIME (in μs) is defined in the TXTIME and PSDU_LENGTH calculation, and m is one when the HE PPDU is an HE_MU PPDU or an HE extended range SU PPDU and is two otherwise. $T_{SE}$ is 0 μs when a station is operating in a 5 GHz band, and 6 μs when the station is operating in a 2.4 GHz band.

Embodiments under Option C, when operating in a 2.4 GHz band, do not change a length of the SIFS interval after an HE PPDU but use a Packet Extension length extended to be 6 μs longer, and which may include a gap time.

In embodiment, a packet extension at the end of an HE PPDUs is extended to that an effective inter frame interval, always 16 μs, after an HE PPDU, the 16 μs including an additional packet extension duration of 6 μs and a SIFS of 10 μs in a 2.4 GHz band, and including an SIFS of 16 μs in a 5 GHz band.

Figure 16:
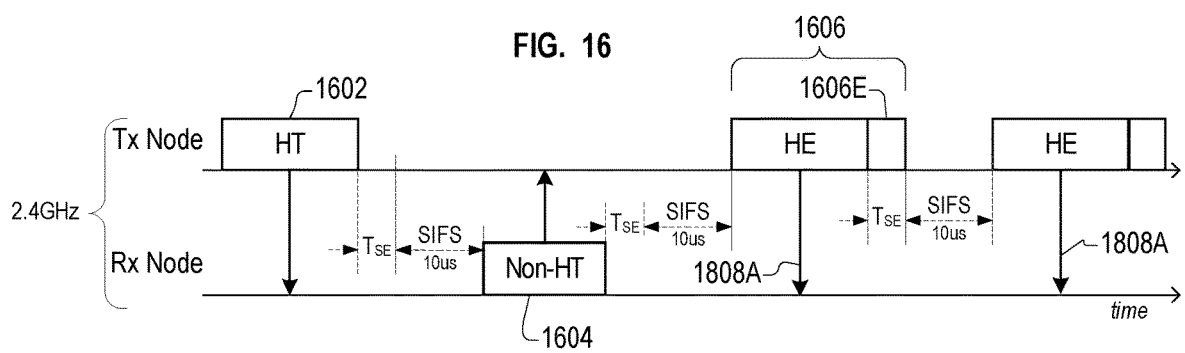
FIG. 16 illustrates inter-frame time intervals between Non-HT, HT, and HE PPDUs in a 2.4 GHz band, according to an embodiment.

FIG. 16 illustrates inter-frame time intervals between Non-HT, HT, and HE PPDUs in a 2.4 GHz band, according to an embodiment. In the embodiment of FIG. 16, a SIFS remains 10 μs and a Signal Extension and, in embodiments, Gap Time are appended to HE PPDUs being transmitted in the 2.4 GHz band. As a result, a total inter frame interval between HE PPDU is 16 μs (i.e., a signal extension of 6 μs plus a SIFS of 10 μs in the 2.4 GHz band, and a SIFS of 16 μs in a 5 GHz band).

FIG. 16 shows a an Rx Node will wait for a signal extension of 6 μs and a SIFS interval of 10 μs after an HT PPDU 1602 or a Non-HT PPDU 1604. An Rx Node will wait for a SIFS interval of 10 μs after a first HE PPDU 1606. However, the first HE PPDU 1606 includes a 6 μs extension 1606E to a packet extension of the HE PPDU 1606, which creates an effective delay of 16 μs.

To ensure that all stations (that is, both HE and non-HE stations) compute the same effective TXTIME, the L_LENGTH signaling in the L-SIG of the HE PPDU should not take into account the extra 6 μs of packet extension added to HE PPDUs in the 2.4 GHz band.

Figure 17:
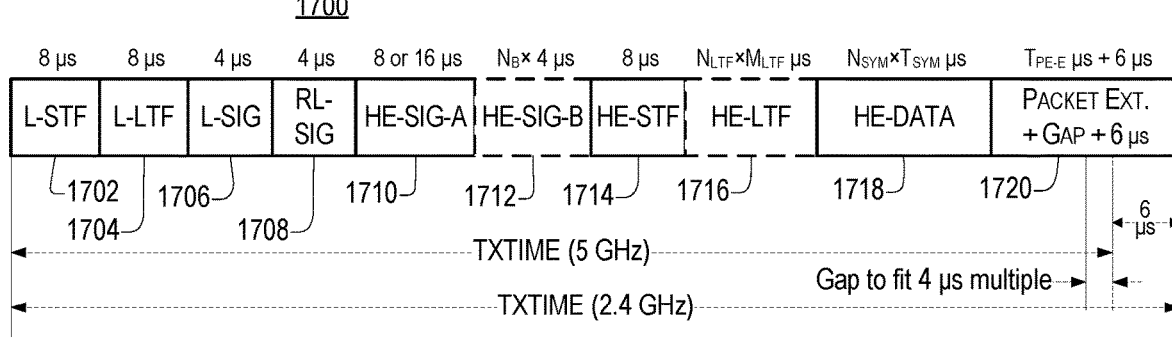
FIG. 17 illustrates an HE PPDU having a packet extension extended by a gap time and by 6 microseconds (μs), according to an embodiment.

FIG. 17 illustrates an HE PPDU 1700 in which the packet extension duration is further increased by a small time gap, in addition to the 6 μs mentioned above, when a station is operating in 2.4 GHz band, according to an embodiment. Increasing the packet extension duration by the small time gap makes that total HE PPDU duration, exclusive of the additional 6 μs of packet extension, an integer multiple of 4 μs. The new packet extension duration is denoted as $T_{PE-E}$+6 μs.

The HE PPDU 1700 includes an L-STF 1702, an L-LTF 1704, an L-SIG field 1706, and an RL-SIG 1708. The HE PPDU frame 1700 also includes an HE-SIG-A field 1710, an optional HE-SIG-B field 1712, an HE-STF 1714, an HE-LTF 1716, and an HE-Data field 1718. These fields are as described for the corresponding fields in FIG. 6.

The HE PPDU 1700 further includes a Packet Extension 1720 containing arbitrary content. In the embodiment of FIG. 17, the station transmitting the HE PPDU 1700 shall transmit at a non-zero power during the entire extended packet extension 1720, ideally with the same transmit power as the rest of HE PPDU 1700.

The change in the TXTIME duration for the HE PPDU 1700 requires changes in the equations for deriving packet extension length dis-ambiguity. The packet extension length dis-ambiguity is used to identify whether the last potential OFDM symbol is a packet extension of a regular data OFDM symbol. In an embodiment, the last potential OFDM symbol of the HE PPDU 1700 is packet extension (and a PE Disambiguity bit in the HE-SIG-A is set to 1 to indicate such to receiving stations) when the condition $T_{PE-E} \geq T_{SYM}$ is met, and otherwise the PE Disambiguity subfield shall be set to 0.

$T_{PE-E}$ is the extended PE duration and given by any one of:

$$T_{PE-E} = T_{PE} + \left(4\left\lceil\frac{X}{4}\right\rceil - (X)\right), \qquad \text{Eq. 35}$$

$$X = N_{HE-LTF}T_{HE-LTF-SYM} + N_{SYM}T_{SYM}$$

$$T_{PE-E} = T_{PE} + \left(4\left\lceil\frac{X}{4}\right\rceil - (X)\right), \qquad \text{Eq. 36}$$

$$X = T_{HE-PREAMBLE} + N_{SYM}T_{SYM}$$

$$T_{PE-E} = T_{PE} + \left(4\left\lceil\frac{X}{4}\right\rceil - (X)\right), \qquad \text{Eq. 37}$$

$$X = T_{LEG-PREAMBLE} + T_{HE-PREAMBLE} + N_{SYM}T_{SYM}$$

Based on a PE disambiguity field and an a-factor field of a PE field of an HE-SIG-A field of the HE PPDU 1700, a station receiving the HE PPDU 1700 shall compute the number of symbols $N_{SYM}$ in the HE-Data field 1718 and the duration $T_{PE}$ of the Packet Extension. The total packet extension duration is $T_{PE-E} \pm T_{SE}$.

In the embodiment, the TXTIME calculation for the HE PPDU 1700 is updated to take into account the extended packet extension by the time gap at the end of HE PPDU 1700.

When an HE PPDU is an HE SU PPDU or HE trigger-based PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + \qquad \text{Eq. 38}$$

$$T_{HE-SIG-A} + T_{HE-PREAMBLE} + N_{SYM}T_{SYM} + T_{PE-E} + T_{SE}$$

When an HE PPDU is an HE_MU PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + T_{HE-SIG-A} + \qquad \text{Eq. 39}$$

$$N_{HE-SIG-B}T_{HE-SIG-B} + T_{HE-PREAMBLE} + N_{SYM}T_{SYM} + T_{PE-E} + T_{SE}$$

When an HE PPDU is an HE extended range SU PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + T_{HE-SIG-A} + \qquad \text{Eq. 40}$$

$$T_{HE-SIG-A-E} + T_{HE-PREAMBLE} + N_{SYM}T_{SYM} + T_{PE-E} + T_{SE}$$

An L_LENGTH field of the L-SIG field of the HE PPDU 1700 is computed based on the following equation. The L-SIG field is used to communicate rate and length information. In an HE PPDU, the RATE field shall be set to the value representing 6 Mb/s. The $T_{SE}=6$ µs is subtracted out during the L_LENGTH value calculation from the TXTIME of the HE PPDU. The LENGTH field shall be set to the value given by|

$$\text{L\_LENGTH} = \left\lceil \frac{TXTIME - T_{SE} - 20}{4} \right\rceil \times 3 - 3 - m \qquad \text{Eq. 41}$$

Or equivalently (when TXTIME-$T_{SE}$ is always given in units of 4 µs):

$$\text{L\_LENGTH} = \left(\frac{TXTIME - T_{SE} - 20}{4}\right) \times 3 - 3 - m \qquad \text{Eq. 42}$$

where TXTIME (in µs) is defined in the TXTIME and PSDU_LENGTH calculation, and m is one when the HE PPDU is an HE_MU PPDU or an HE extended range SU PPDU and is two otherwise. $T_{SE}$ is 0 µs when a station is operating in a 5 GHz band, and 6 µs when the station is operating in a 2.4 GHz band.

Embodiments under Option D, when operating in a 2.4 GHz band, do not change a length of the SIFS interval after an HE PPDU and add a signal extension after the HE PPDU. Embodiments in Option D do not resolve the difference in TXTIME calculation between HE stations and non-HE stations.

Figure 18:
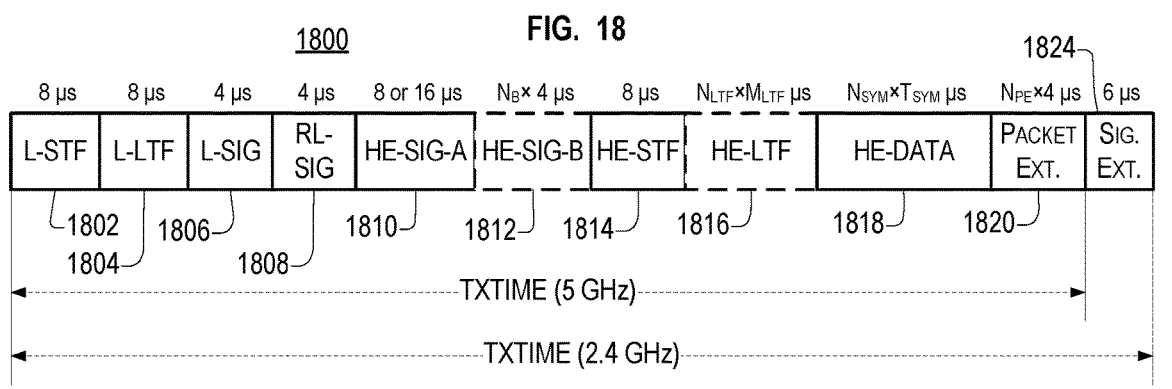
FIG. 18 illustrates an HE PPDU having a signal extension, according to an embodiment.

FIG. 18 illustrates an HE PPDU 1800 having a signal extension, according to an embodiment. The HE PPDU 1800 includes an L-STF 1802, an L-LTF 1804, an L-SIG field 1806, and an RL-SIG 1808. The HE PPDU frame 1800 also includes an HE-SIG-A field 1810, an optional HE-SIG-B field 1812, an HE-STF 1814, an HE-LTF 1816, and an HE-Data field 1818. These fields are as described for the corresponding fields in FIG. 6.

The HE PPDU 1800 further includes a Packet Extension 1820 containing arbitrary content. In the embodiment of FIG. 18, the station transmitting the HE PPDU 1800 shall transmit at a non-zero power during the entire packet extension 1820, ideally with the same transmit power as the rest of HE PPDU 1800.

The HE PPDU 1800 further includes a signal extension 1824. During the signal extension 1824, no energy is transmitted by the station transmitting the HE PPDU 1800.

The PE Disambiguity subfield of the Packet Extension field shall be set to 1 if the condition in Equation 43, below, is met, otherwise it shall be set to 0:

$$T_{PE} + \left(4\left\lceil \frac{TXTIME - T_{SE} - 20}{4} \right\rceil - (TXTIME - T_{SE} - 20)\right) \geq T_{SYM} \qquad \text{Eq. 43}$$

where $T_{PE}$ is a duration of the PE 1820, $T_{SYM}$ is a duration of symbols in a Data field 1818 as defined in Table 2, TXTIME (in µs) is a transmit time of the HE PPDU 1800, and $T_{SE}$ is a duration of Signal Extension.

Based on a PE disambiguity field and an a-factor field of a PE field of an HE-SIG-A 1810 field of the HE PPDU 1800, a station receiving the HE PPDU 1800 shall compute the number of symbols $N_{SYM}$ in the HE-Data field 1818 and the duration $T_{PE}$ of the Packet Extension 1820.

In the embodiment, the TXTIME calculation for the HE PPDU 1800 is updated to take into account the added signal extension at the end of HE PPDU 1800.

When an HE PPDU is an HE SU PPDU or HE trigger-based PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + \qquad \text{Eq. 44}$$
$$T_{HE-SIG-A} + T_{HE-PREAMBLE} + N_{SYM}T_{SYM} + T_{PE} + T_{SE}$$

When an HE PPDU is an HE_MU PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + T_{HE-SIG-A} + \qquad \text{Eq. 45}$$
$$N_{HE-SIG-A}T_{HE-SIG-B} + T_{HE-PREAMBLE} + N_{SYM}T_{SYM} + T_{PE} + T_{SE}$$

When an HE PPDU is an HE extended range SU PPDU, the value of the TXTIME parameter returned by the PLME-TXTIME.confirm primitive shall be calculated for the HE PPDU using:

$$TXTIME = T_{LEG-PREAMBLE} + T_{L-SIG} + T_{RL-SIG} + T_{HE-SIG-A} + \qquad \text{Eq. 46}$$
$$T_{HE-SIG-A-E} + T_{HE-PREAMBLE} + N_{SYM}T_{SYM} + T_{PE} + T_{SE}$$

In the equations, $T_{LEG-PREAMBLE}$ is equal to $T_{L-STF}+T_{L-LTF}$ and $T_{HE-PREAMBLE}$ is equal to $T_{HE-ST-T}+N_{HE-LTF}T_{HE-LTF-SYM}$ when the HE PPDU is an HE trigger-based PPDU and to $T_{HE-STF-NT}+N_{HE-LTF}T_{HE-LTF-SYM}$ otherwise. Table 2, Timing Related Constants, of FIG. 7 provides definitions for $T_{L-STF}$, $T_{L-LTF}$, $T_{HE-STF-T}$, $T_{HE-STF-NT}$, $T_{HE-LTF-SYM}$, $T_{L-SIG}$, $T_{RL-SIG}$, $T_{HE-SIG-A}$, $T_{HE-SIG-A-R}$, $T_{HE-SIG-B}$, and $T_{SYM}$. $N_{HE-SIG-B}$ and $N_{HE-LTF}$ are indicated signaling in an HE-SIG-A field of the HE-PPDU. $T_{PE}$ is the packet extension duration. $T_{SE}$ is 0 µs when operating in a 5 GHz band and 6 µs when operating in a 2.4 GHz band.

Non-HE-capable stations (i.e., non-HE stations) may compute a TXTIME of a received HE PPDU to be slightly larger than that computed by HE-capable stations. The TXTIME calculation error in the computation of TXTIME by the non-HE stations stems from the fact that TXTIME of the HE PPDU length is not actually a multiple of 4 µs, but all non-HE stations assume that all PPDUs are always a integer multiple of 4 µs. Therefore, non-HE stations may compute the TXTIME of the HE PPDU 1800 to be slightly longer than what HE STAs stations for the TXTIME.

An LENGTH field of the L-SIG field of the HE PPDU 1800 is computed based on the following equation. The L-SIG field is used to communicate rate and length information. In an HE PPDU, the RATE field shall be set to the value representing 6 Mb/s. The signal extension duration $T_{SE}=6$ µs is subtracted out during the L_LENGTH value calculation from the TXTIME of the HE PPDU. A value L_LENGTH of the LENGTH field shall be set to:

$$\text{L\_LENGTH} = \left\lceil \frac{TXTIME - T_{SE} - 20}{4} \right\rceil \times 3 - 3 - m \qquad \text{Eq. 47}$$

where TXTIME (in µs) is defined in the TXTIME and PSDU_LENGTH calculation, and m is one when the HE PPDU is an HE_MU PPDU or an HE extended range SU PPDU and is two otherwise. $T_{SE}$ is 0 µs when a station is operating in a 5 GHz band, and 6 µs when the station is operating in a 2.4 GHz band.

Regarding transmission and reception procedures, a transmit procedure simply follows the TXTIME calculation described in the embodiment adopted. The receive procedure is a reverse operation of the transmit procedure. Here we provide example of transmit and receive procedure based on an embodiment including the features illustrated in FIG. 13. TX and RX procedures for other embodiments are similar with this example.

For an HE transmit procedure, there are five options for the transmit PHY procedure. For the first four options, transmit procedures according to embodiments are shown in FIGS. 19-22. The procedures of FIGS. 19-22 do not describe the operation of optional features, such as DCM.

Figure 19:
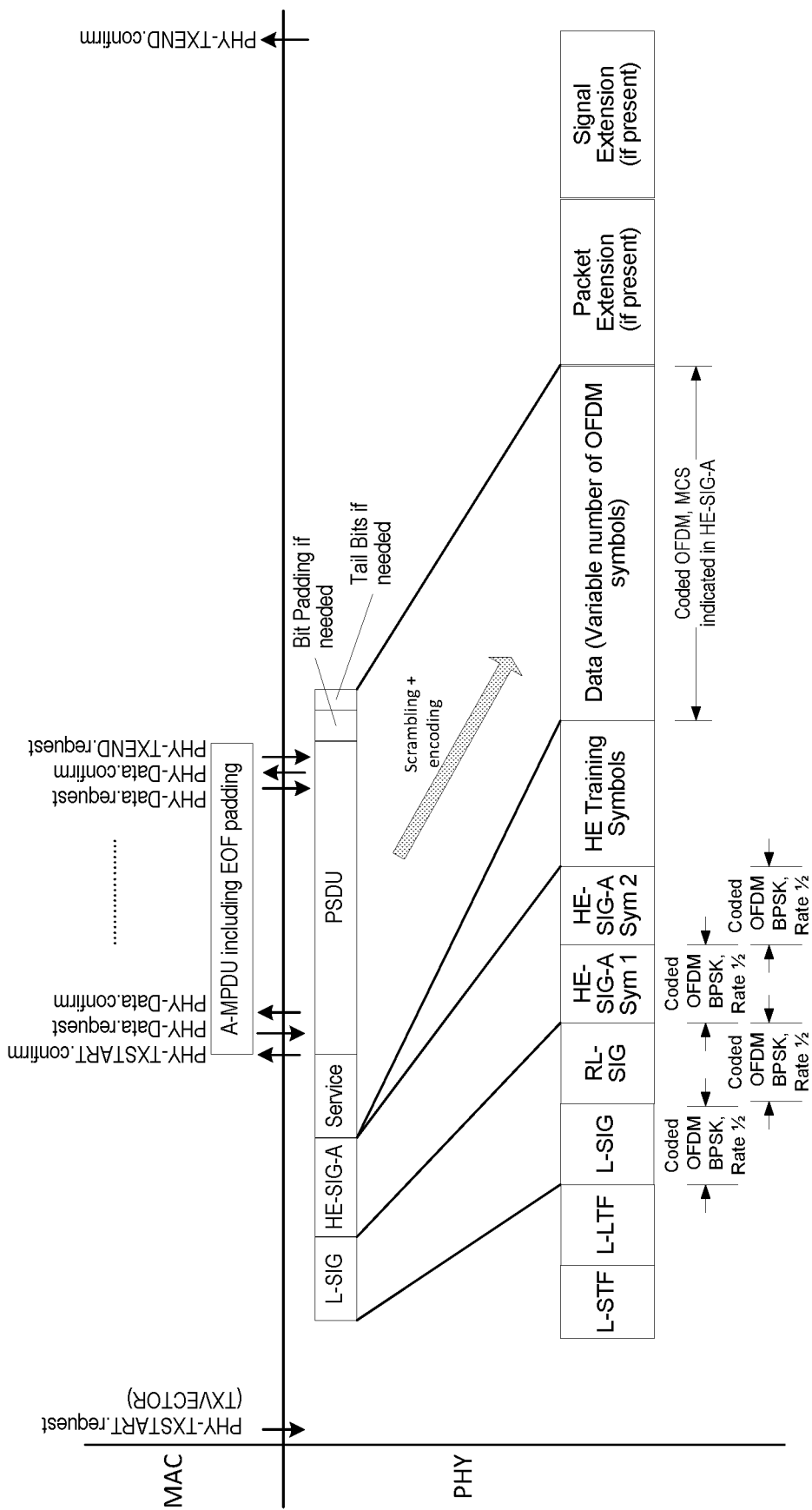
FIG. 19 illustrates a PHY transmit procedure for an HE_SU format PPDU, according to an embodiment.

FIG. 19 illustrates a PHY transmit procedure for an HE Single User (HE SU) format PPDU, according to an embodiment. The PHY transmit procedure of FIG. 19 is used when the FORMAT field of the PHY-TXSTART.request(TXVECTOR) primitive is equal to HE_SU.

Figure 20:
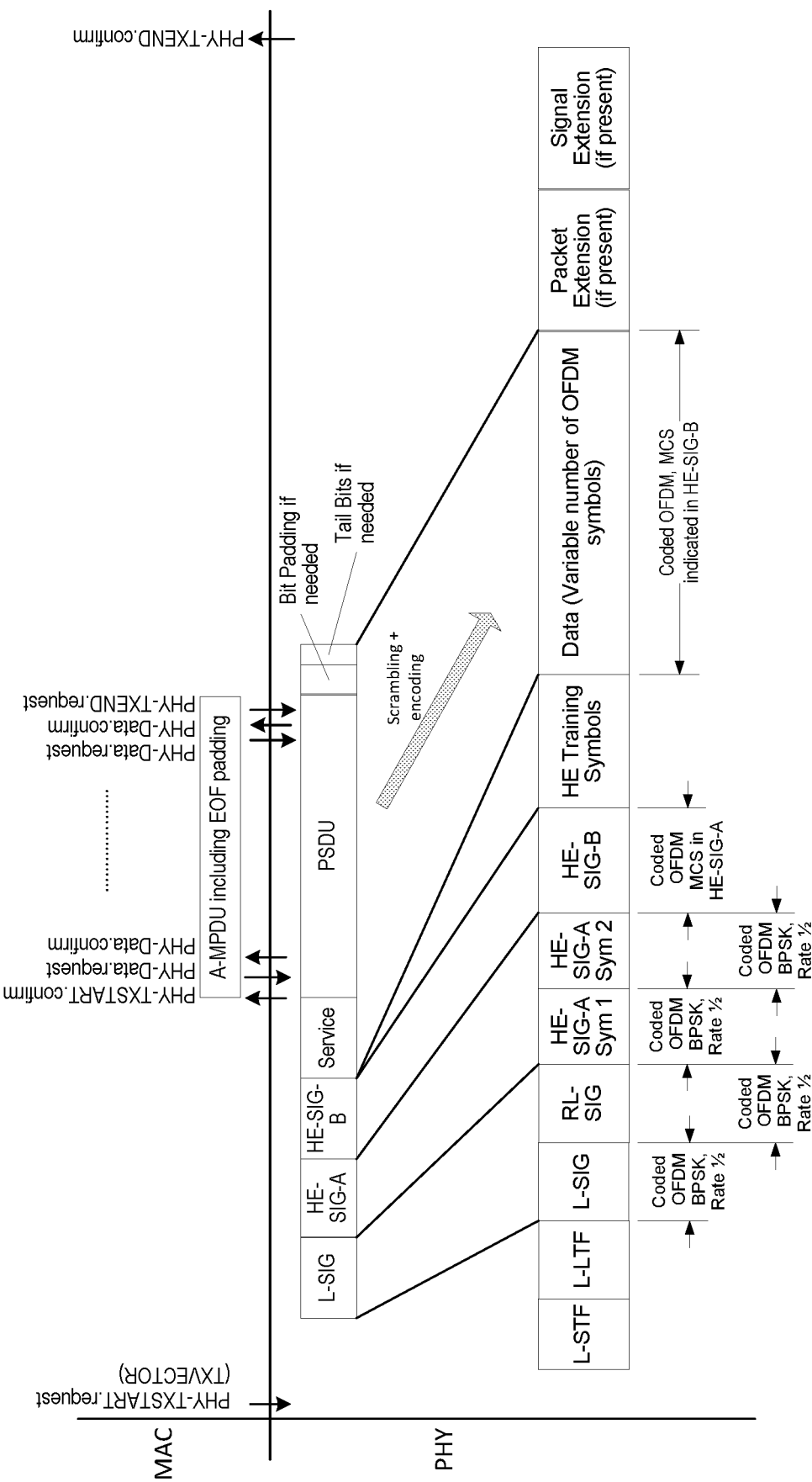
FIG. 20 illustrates a PHY transmit procedure for an HE_MU format PPDU, according to an embodiment.

FIG. 20 illustrates a PHY transmit procedure for an HE Multi-User (HE_MU) format PPDU, according to an embodiment. The PHY transmit procedure of FIG. 20 is used when the FORMAT field of the PHY-TXSTART.request(TXVECTOR) primitive is equal to HE_MU.

Figure 21:
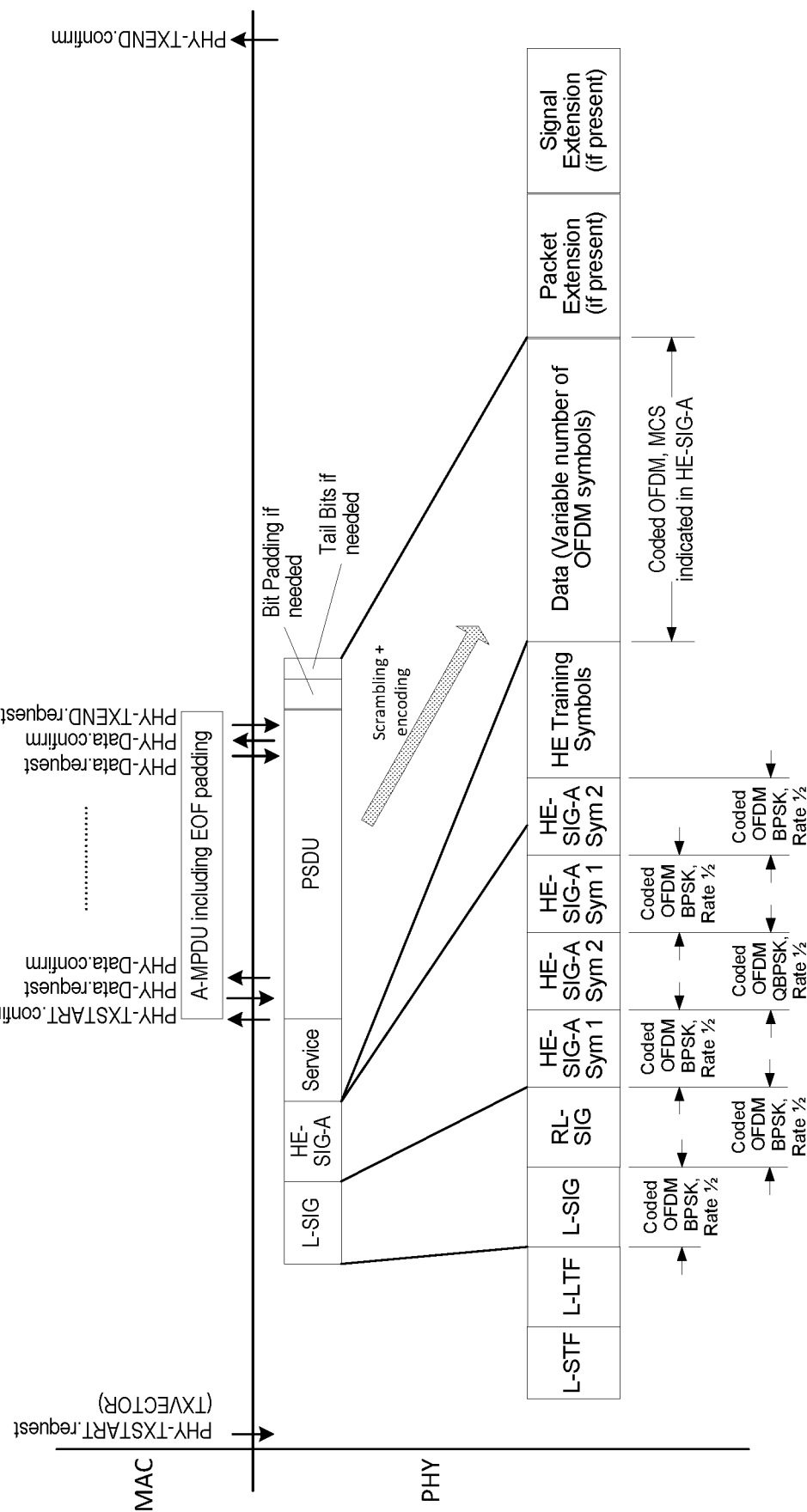
FIG. 21 illustrates a PHY transmit procedure for an HE_EXT_SU format PPDU, according to an embodiment.

FIG. 21 illustrates a PHY transmit procedure for an HE Extended Range Single-User (HE_EXT_SU) format PPDU, according to an embodiment. The PHY transmit procedure of FIG. 21 is used when the FORMAT field of the PHY-TXSTART.request(TXVECTOR) primitive is equal to HE_EXT_SU.

Figure 22:
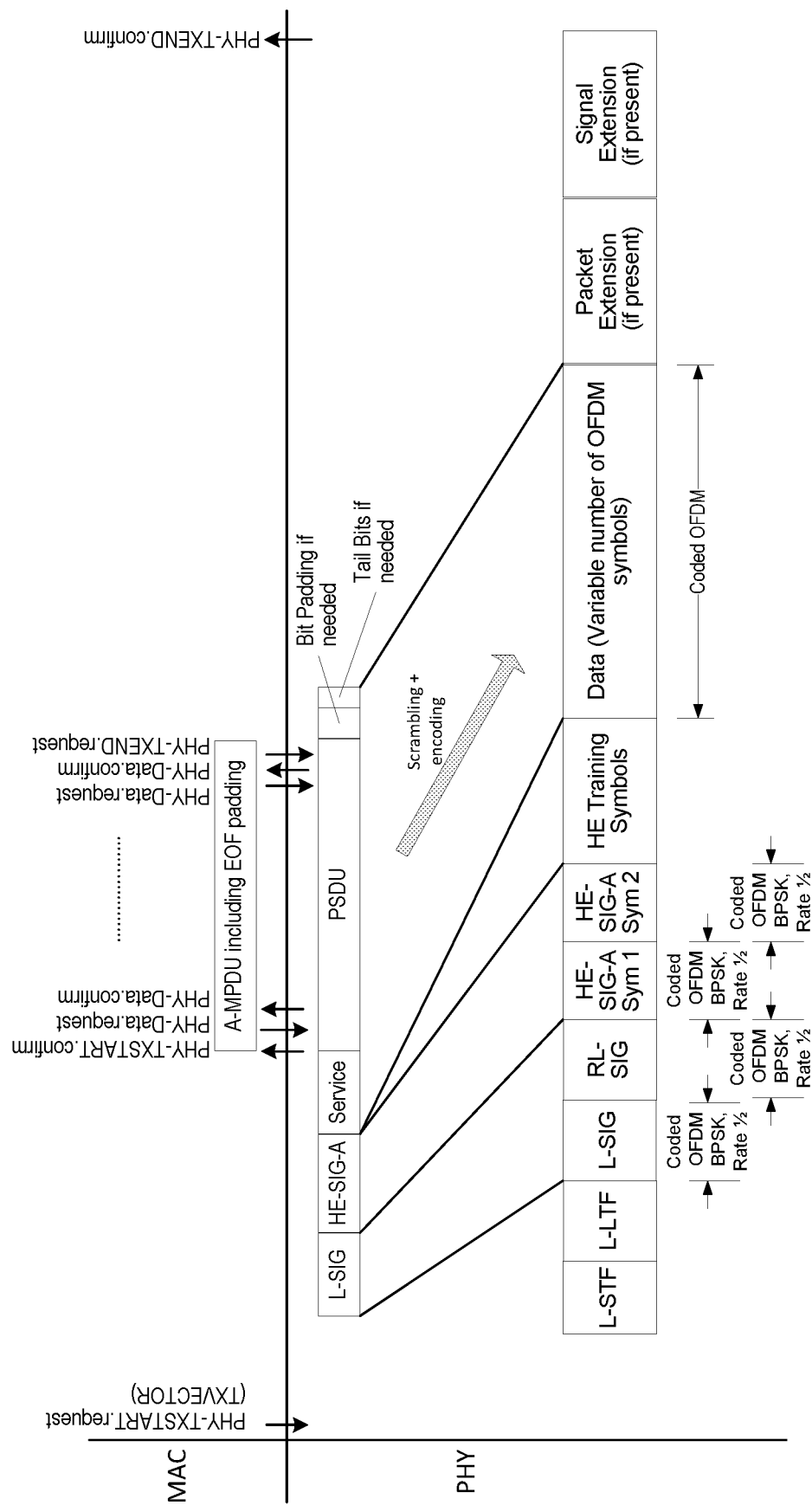
FIG. 22 illustrates a PHY transmit procedure for an HE_TRIG format PPDU, according to an embodiment.

FIG. 22 illustrates a PHY transmit procedure for an HE Trigger (HE_TRIG) format PPDU, according to an embodiment. The PHY transmit procedure of FIG. 22 is used when the FORMAT field of the PHY-TXSTART.request(TXVECTOR) is equal to HE_SU.

The fifth option is to follow the transmit procedure in Clause 18 (Orthogonal frequency division multiplexing (OFDM) PHY specification) of the IEEE 802.11 standards, incorporated by reference herein in their entirety, if the FORMAT parameter of the PHY-TXSTART.request (TXVECTOR) primitive is NON_HT and the NON_HT_MODULATION parameter is set to NON_HT_DUP_OFDM, except that the signal referred to in Clause 18 is instead generated simultaneously on each of the 20 MHz channels that are indicated by a CH_BANDWIDTH parameter.

In FIG. 20, Note that for an HE_MU PPDU the A-MPDU is per user in the MAC sublayer and the HE Training Symbols and Data are per user in the PHY layer, with the number HE Training Symbols depending on the maximum total number of space-time streams across all RUs.

The transmit procedures for PPDUs having frame format of Non-HT (NON_HT), HT Mixed Format (HT_MF), HT Greenfield Format (HT_GF), and VHT format are beyond the scope of this document.

Figure 23A:
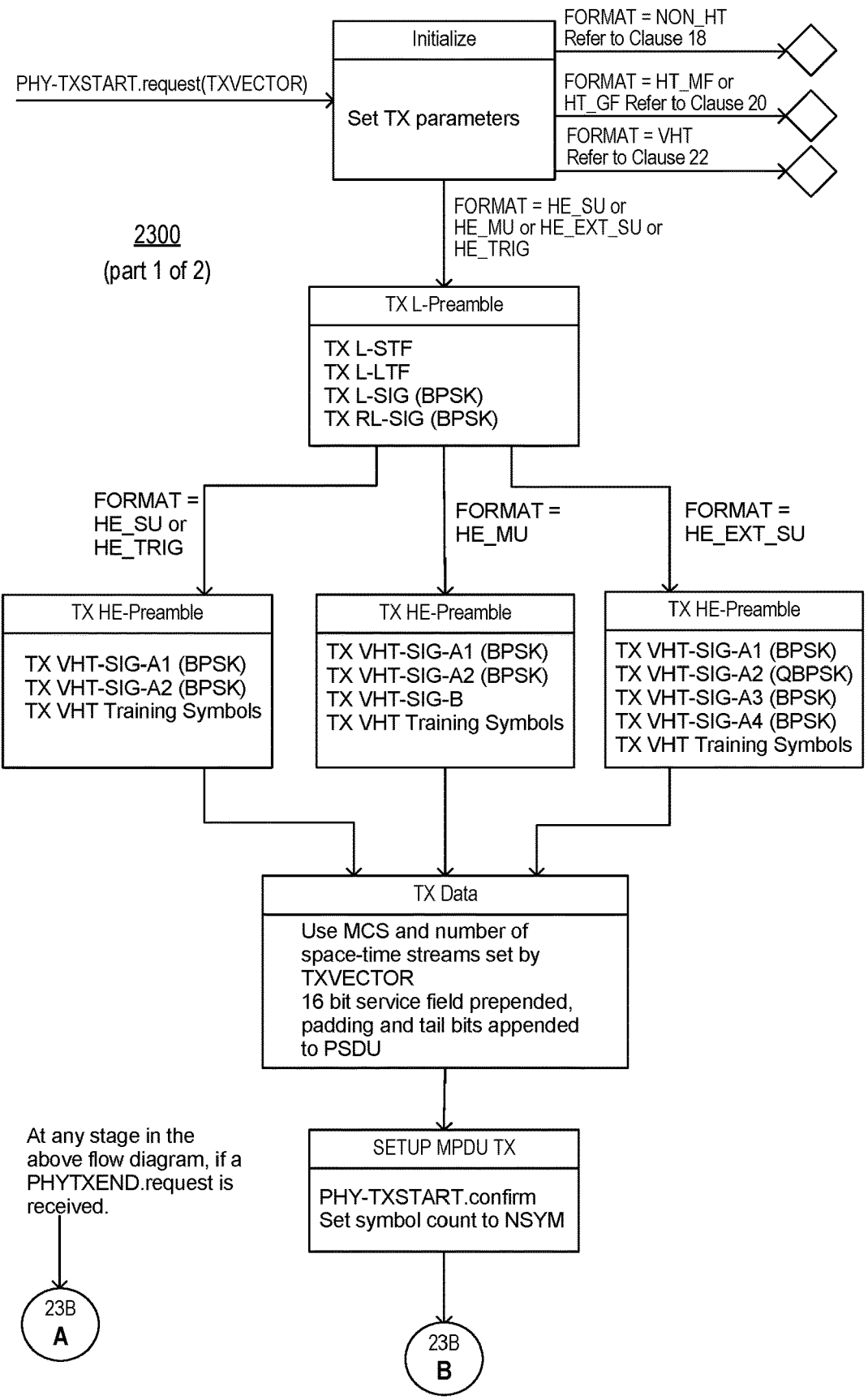
FIGS. 23A and 23B illustrate a PHY transmit state machine for an HE capable PHY, according to an embodiment.
Figure 23B:
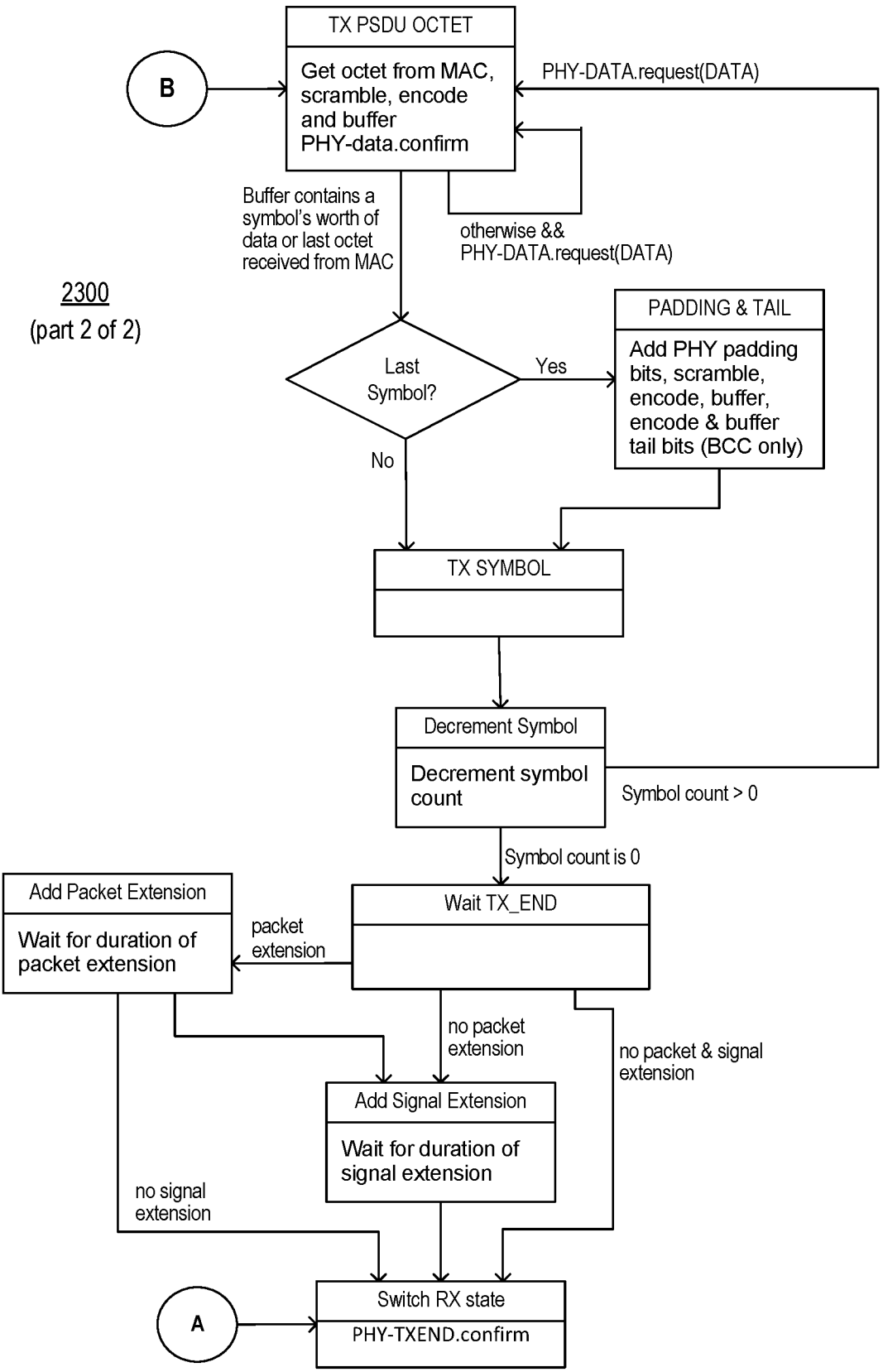

FIGS. 23A and 23B illustrate a first and second parts, respectively, of a state machine implementation 2300 of the transmit PHY for a HE PPDU transmission by an HE-capable PHY, according to an embodiment. Request (.request) and confirmation (.confirm) primitives are issued once per state as shown. This state machine does not describe the operation of optional features, such as DCM.

In FIGS. 23A and 23B, operations described in the extant IEEE 802.11 standard, some of which may not be pertinent to the claimed embodiments, are described with reference to the appropriate clauses in the IEEE 802.11 standard. Some operation of the PHY when transmitting are described below.

In all the above-described five options, in order to transmit data, the MAC generates a PHY-TXSTART.request primitive, which causes the PHY entity to enter the transmit state. Further, the PHY is set to operate at the appropriate frequency through station management via the PLME. Other transmit parameters, such as HE-MCS Coding types and transmit power, are set via the PHY-SAP using the PHY-TXSTART.request(TXVECTOR) primitive.

The PHY indicates the state of the primary channel and other channels (if any) via a PHY-CCA.indication primitive. Transmission of the PPDU shall be initiated by the PHY after receiving the PHY-TXSTART.request(TXVECTOR) primitive.

Transmission of a PHY preamble may start when a TXVECTOR parameter TIME_OF_DEPARTURE_REQUESTED is false, and shall start when the TXVECTOR parameter TIME_OF_DEPARTURE_REQUESTED is true, based on the parameters passed in the PHY-TXSTART.request primitive.

If dot11TODImplemented and dot11TODActivated are true or if dot11TimingMsmtActivated is true, then if the TXVECTOR parameter TIME_OF_DEPARTURE_REQUESTED is true, the PHY shall issue a PHY-TXSTART.confirm(TXSTATUS) primitive to the MAC, forwarding the TIME_OF_DEPARTURE corresponding to the time when the first frame energy is sent by the transmitting port and TIME_OF_DEPARTURE ClockRate parameter within the TXSTATUS vector. If dot11TimingMsmtActivated is true, then the PHY shall forward the value of TX_START_OF_FRAME_OFFSET in TXSTATUS vector.

After the PHY preamble transmission is started, the PHY entity immediately initiates data scrambling and data encoding. The encoding method for the Data field is based on the FEC_CODING, CH_BANDWIDTH, NUM_STS, STBC, MCS, and NUM_USERS parameters of the TXVECTOR.

The SERVICE field and PSDU are encoded. The data shall be exchanged between the MAC and the PHY through a series of PHY-DATA.request(DATA) primitives issued by the MAC, and PHY-DATA.confirm primitives issued by the PHY. PHY padding bits are appended to the PSDU to make the number of bits in the coded PSDU an integral multiple of the number of coded bits per OFDM symbol.

The MAC can prematurely terminate transmission through the PHY-TXEND.request primitive. PSDU transmission is terminated by receiving a PHY-TXEND.request primitive. Each PHY-TXEND.request primitive is acknowledged with a PHY-TXEND.confirm primitive from the PHY.

In the embodiment illustrated by FIG. 14, a packet extension may be present in the PPDU. When no packet extension and no signal extension is present, the PHY-TXEND.confirm primitive is generated at the end of last symbol of the PPDU (rounded up to the nearest 4 µs interval). When a packet extension is present and no signal extension is present, the PHY-TXEND.confirm primitive is generated at the end of the packet extension. When no packet extension is present and a signal extension is present, the PHY-TXEND.confirm primitive is generated at the end of the signal extension. When a packet extension and a signal extension is present, the PHY-TXEND.confirm primitive is generated at the end of the signal extension.

In the PHY, the GI with GI duration indicated in GI_TYPE parameter of the TXVECTOR is inserted in every data OFDM symbol as a countermeasure against delay spread.

When the PPDU transmission is completed the PHY entity enters the receive state.

Illustrative PHY receive procedures for some HE PPDUs, according to embodiments, are illustrated in FIGS. 24-27. The procedures of FIGS. 24-27 do not describe the operation of optional features, such as DCM.

Figure 24:
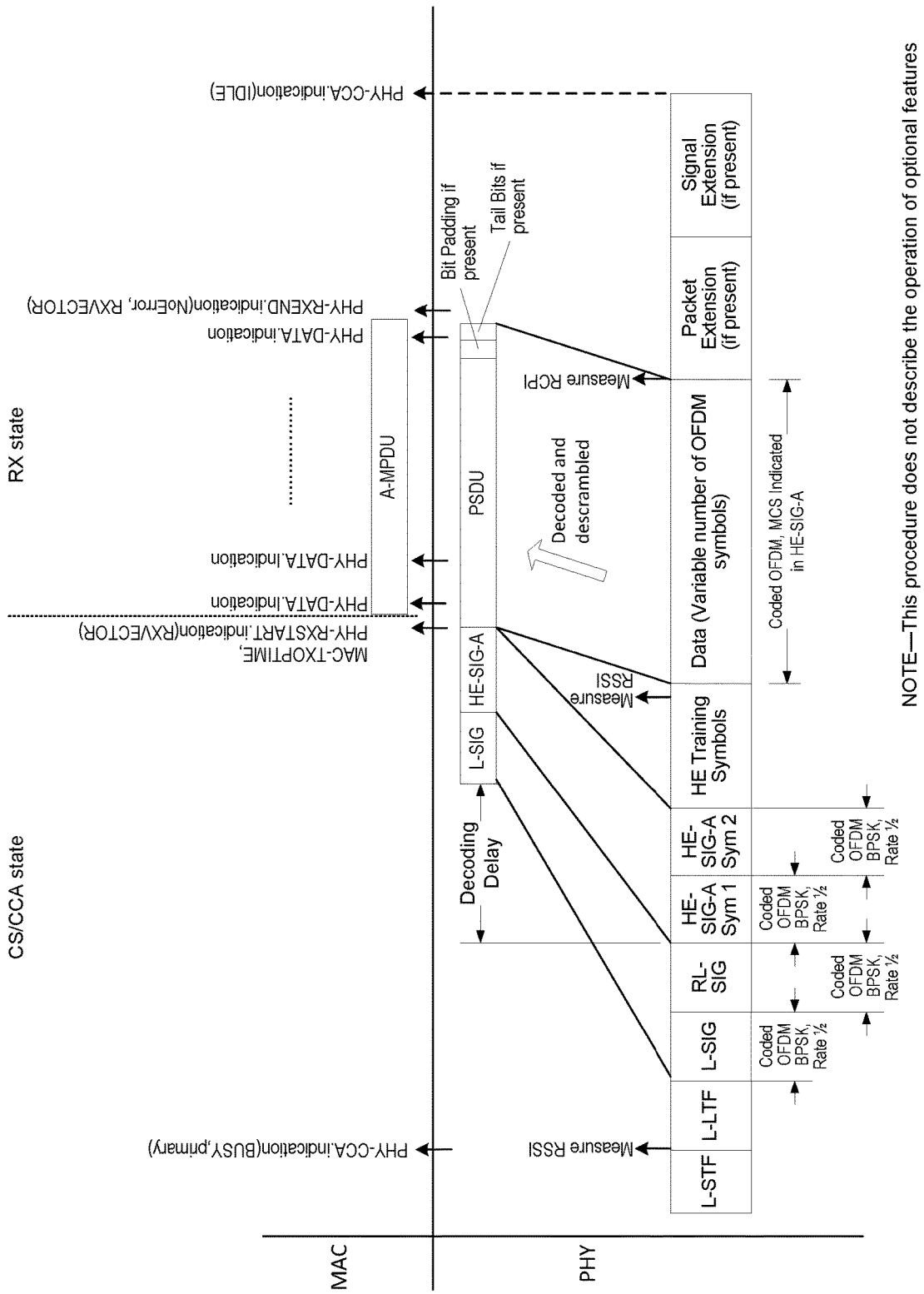
FIG. 24 illustrates a PHY Receive procedure or a PPDU having an HE_SU preamble, according to an embodiment.

FIG. 24 illustrates a PHY receive procedure for an HE Single User (HE_SU) format PPDU, according to an embodiment. The PHY transmit procedure of FIG. 24 is used when an HE preamble of a received PPDU indicates the PPDU is an HE_SU_PPDU.

Figure 25:
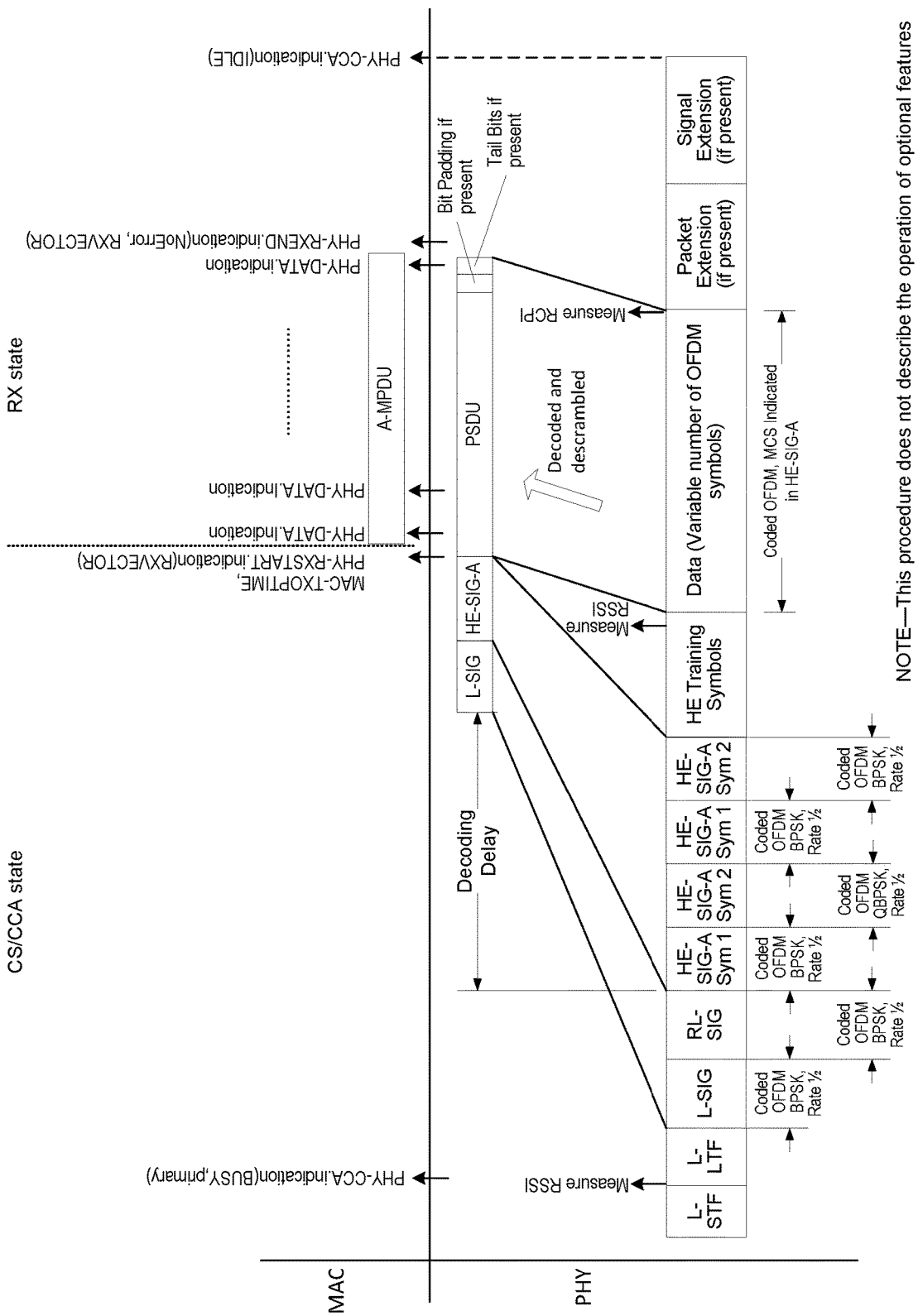
FIG. 25 illustrates a PHY Receive procedure for a PPDU having an HE_EXT_SU preamble, according to an embodiment.

FIG. 25 illustrates a PHY receive procedure for an HE Multi-User (HE_MU) format PPDU, according to an embodiment. The PHY transmit procedure of FIG. 25 is used when an HE preamble of a received PPDU indicates the PPDU is an HE_MU PPDU.

Figure 26:
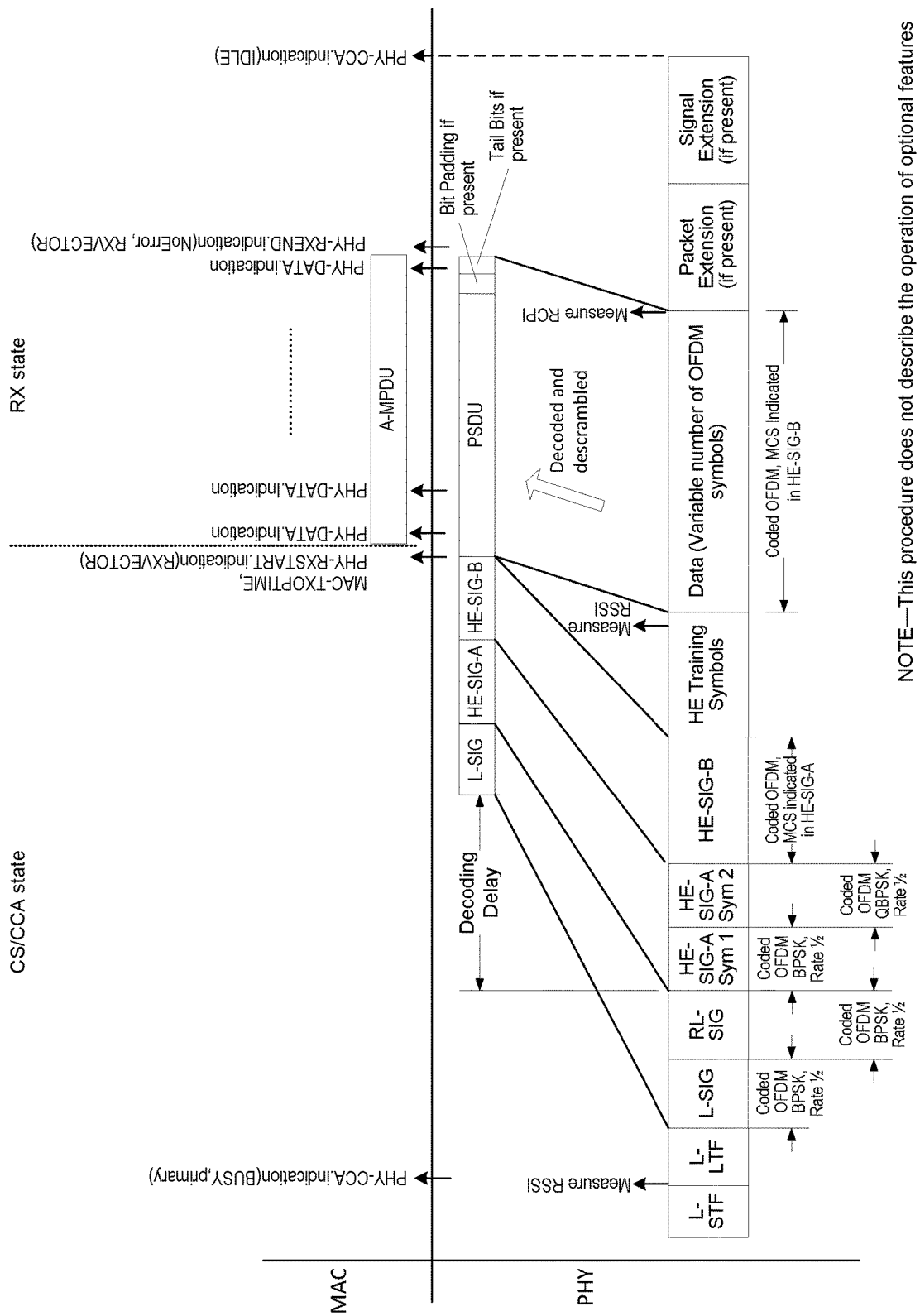
FIG. 26 illustrates a PHY Receive procedure for a PPDU having an HE_MU preamble, according to an embodiment.

FIG. 26 illustrates a PHY receive procedure for an HE Extended Range Single-User (HE_EXT_SU) format PPDU, according to an embodiment. The PHY transmit procedure of FIG. 26 is used when an HE preamble of a received PPDU indicates the PPDU is an HE_EXT_SU PPDU.

Figure 27:
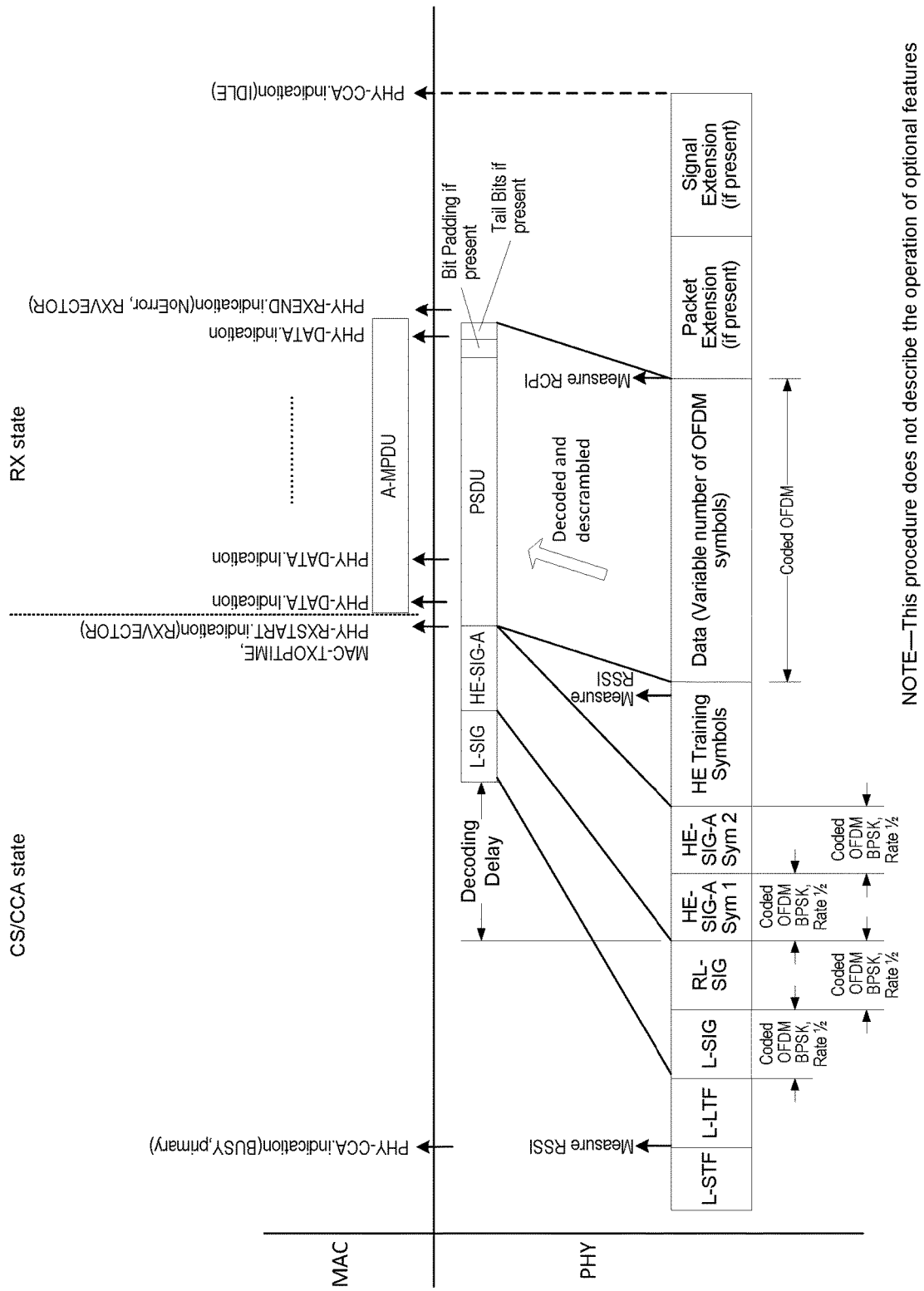
FIG. 27 illustrates a PHY Receive procedure for a PPDU having an HE_TRIG preamble, according to an embodiment.

FIG. 27 illustrates a PHY receive procedure for an HE Trigger (HE_TRIG) format PPDU, according to an embodiment. The PHY transmit procedure of FIG. 27 is used when an HE preamble of a received PPDU indicates the PPDU is an HE_TRIG PPDU.

Figure 28A:
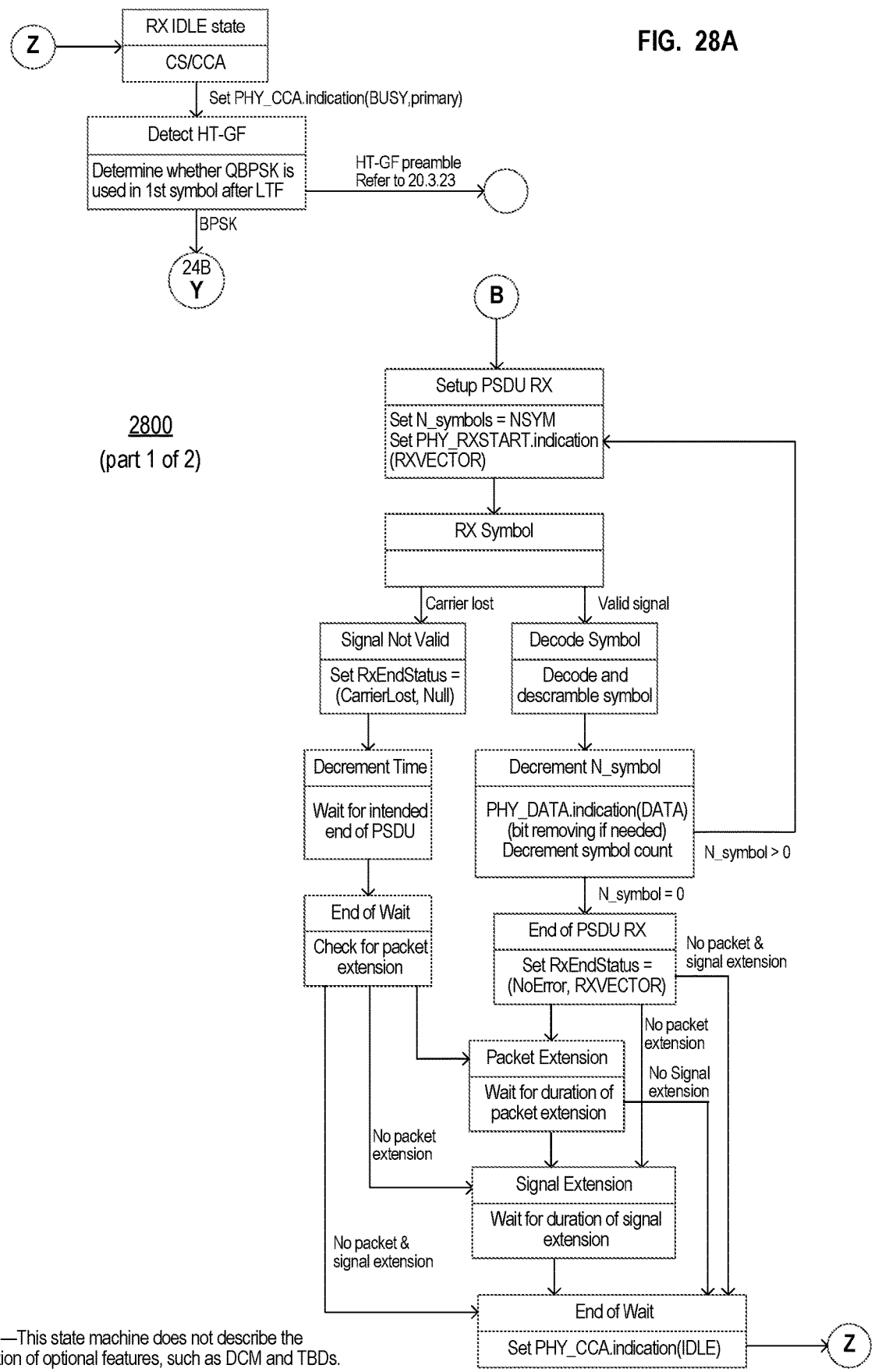

FIGS. 28A and 28B illustrate first and second parts, respectively, of a typical PHY receive state machine implementation. These receive procedures and state machine do not describe the operation of optional features, such as DCM.

In FIGS. 28A and 28B, operations described in the extant IEEE 802.11 standard, some of which may not be pertinent to the claimed embodiments, are described with reference to the appropriate clauses in the IEEE 802.11 standard. Some operation of the PHY when transmitting are described below.

If the detected format indicates a NON_HT PPDU, refer to the receive procedure and state machine in Clause 18 (Orthogonal frequency division multiplexing (OFDM) PHY specification). If the detected format indicates an HT PPDU format, refer to the receive procedure and state machine in Clause 20 (High Throughput (HT) PHY specification). If the detected format indicates a VHT PPDU format, refer to the receive procedure and state machine in Clause 22 (Very High Throughput (VHT) PHY specification). Through station management (via the PLME) the PHY is set to the appropriate frequency, as specified in 26.4 (HE PLME). The PHY has also been configured with cell identification information and STA identification information (i.e., BSS Color value and STA ID in the cell) so that it can receive data intended for the STA in the specific cell. Other receive parameters, such as RSSI and indicated DATARATE, may be accessed via the PHY-SAP.

Upon receiving the transmitted PHY preamble overlapping the primary 20 MHz channel in a greater than or equal to 20 MHz BSS, the PHY measures a receive signal strength. This activity is indicated by the PHY to the MAC via a PHY-CCA.indication primitive. A PHY-CCA.indication (BUSY, channel-list) primitive is also issued as an initial indication of reception of a signal. The channel-list parameter of the PHYCCA.indication primitive is absent when the operating channel width is 20 MHz. The channel-list parameter is present and includes the element primary when the operating channel width is 40 MHz, 80 MHz, 160 MHz, or 80+80 MHz.

The PHY shall not issue a PHY-RXSTART.indication primitive in response to a PPDU that does not overlap the primary channel. The PHY includes the most recently measured RSSI value in the PHY-RXSTART.indication (RXVECTOR) primitive issued to the MAC.

After the PHY-CCA.indication(BUSY, channel-list) primitive is issued, the PHY entity shall begin receiving the training symbols and searching for the preambles for a non-HT, HT, VHT, and HE PPDUs. If the constellation used in the first symbol after the first long training field is modulated in QBPSK, the PHY entity shall continue to detect the received signal using the receive procedure for HT-GF depicted in Clause 20 of the IEEE Std 802.11. Otherwise, to detect the HE preamble, the PHY entity shall search for L-SIG and RL-SIG fields in order to set the maximum duration of the data stream. If an RL-SIG field is detected, the PHY entity shall check the parity bits and RATE fields in the L-SIG and RL-SIG fields. If the check of the parity bits is invalid or the RATE field is not set to MCS0 in Non-HT, a PHY-RXSTART.indication primitive is not issued. If the check of the parity bit is valid and the RATE field is set to MCS0 but the LENGTH field value in L-SIG is a multiple of 3, a PHY-RXSTART.indication primitive is not issued. In both cases, the PHY should continue to detect the received signal using Non-HT, HT, and VHT receive procedure per Clauses 18, 20, and 22, respectively, of the IEEE Std 802.11.

As shown in FIGS. 24 and 27, if a valid parity bit and the RATE with MCS0 are indicated in the L-SIG and RL-SIG fields and the LENGTH field value in L-SIG and RL-SIG meet the condition that the remainder is 1 after LENGTH is divided by 3, the PHY entity shall begin receiving the sequence of HE-SIG-A field, HE-STF, and HE-LTF for HE_SU PPDU and HE_TRIG PPDU as shown in FIG. 24 and FIG. 27, respectively.

After the RL-SIG field, the PHY entity shall receive two symbols of the HE-SIG-A field immediately followed by the HE-STF. The PHY entity shall check the Cyclic Redundancy Code (CRC) of HE-SIG-A. If the CRC check is valid, the PHY entity shall report a TXOP, check a BSS Color and Format, and continue to receive the HE-STF. The PHY entity shall report to the MAC entity the predicted duration of the TXOP indicated by the HE-SIG-A field.

The PHY entity shall check the BSS color filed in the HE-SIG-A field. If the BSS color field doesn't contain an appropriate value, the PHY entity shall set PHY RXSTART.indication(RXVECTOR) then set PHY_RX-END.indication(Filtered). A complete discussion of BSS Color processing is outside the scope of this document.

The PHY entity shall check the Format field in the HE-SIG-A field. If the Format field indicates an HE_SU PPDU, the PHY entity shall receive the HE-STF for 4 µs after the HE-SIG-A field. If the Format field indicates an HE_TRIG PPDU, the PHY entity shall receive the HE-STF for 8 µs after the HE-SIG-A field. The PHY entity shall maintain PHY-CCA.indication(BUSY, channellist) primitive for the predicted duration of the transmitted PPDU, as defined the IEEE Std 802.11ac, for all supported modes, unsupported modes, a Reserved HE-SIG-A Indication, and for an invalid HE-SIG-A CRC. Reserved HE-SIG-A Indication is defined as an HE-SIG-A field with Reserved bits equal to 0 or some other predetermined value as set in an IEEE Std 802.11 standard. If the HE-SIG-A field indicates an unsupported mode, the PHY shall issue a PHY-RXEND- .indication(UnsupportedRate) primitive. If the HE-SIG-A field indicates an invalid CRC or Reserved HE-SIG-A Indication, the PHY shall issue the error condition PHY-RXEND.indication(FormatViolation) primitive.

As shown in FIG. 25, if a valid parity bit of L-SIG and RL-SIG fields is indicated and the LENGTH field value in L-SIG and RL-SIG meet the condition that the remainder is 2 after LENGTH divided by 3, the PHY entity shall detect the signal constellations in the second symbol after RL-SIG, and if the constellation is QBPSK modulated, the PHY entity shall continue receiving the sequence of HE-SIG-A, HE-STF, and HE-LTF for an HE_EXT_SU PPDU as shown in FIG. 25.

After the RL-SIG field, the PHY entity shall receive four symbols of the HE-SIG-A field immediately followed by the HE-STF. The PHY entity shall check the CRC of HE-SIG-A field. If the CRC check is valid, the PHY entity shall report TXOP, check BSS Color, and continue to receive HE-STF. The PHY entity shall report to the MAC entity the predicted duration of the TXOP indicated by the HE-SIG-A field.

The PHY entity shall check the BSS color field in the HE-SIG-A field. If the BSS color field doesn't contain an appropriate value, the PHY entity shall set the PHY_RXSTART.indication(RXVECTOR) and then set PHY_RXEND.indication(Filtered).

The PHY entity shall receive the HE-STF for 4 μs after the HE-SIG-A field. The PHY entity shall maintain the PHY-CCA.indication(BUSY, channellist) primitive for the predicted duration of the transmitted PPDU for all supported modes, unsupported modes, Reserved HE-SIG-A Indication, and invalid HE-SIG-A CRC. A Reserved HE-SIG-A Indication is defined as an HE-SIG-A with Reserved bits equal to 0 or some other predetermined value as set in an IEEE Std 802.11 standard. If the HE-SIG-A field indicates an unsupported mode, the PHY shall issue a PHY-RXEND.indication (UnsupportedRate) primitive. If the HE-SIG-A field indicates an invalid CRC or a Reserved HE-SIG-A Indication, the PHY shall issue the error condition PHY-RXEND.indication (FormatViolation) primitive.

As shown in FIG. 26, if a valid parity bit of the L-SIG and RL-SIG fields is indicated and the LENGTH field value in the L-SIG and RL-SIG field meet the condition that the remainder is 2 after LENGTH divided by 3, the PHY entity shall detect the signal constellations in the second symbol after RL-SIG, and if the constellation is BPSK modulated, the PHY entity shall continue receiving the sequence of HE-SIG-A, HE-SIG-B, HE-STF, and HE-LTF for an HE_MU PPDU, as shown in FIG. 26.

After the RL-SIG field, the PHY entity shall receive two symbols of the HE-SIG-A field immediately followed by the HE-SIG-B field.

The PHY entity shall check the CRC of the HE-SIG-A field. If the CRC check is valid, the PHY entity shall report TXOP, check BSS Color, and continue to receive the HE-SIG-B field. The PHY entity shall report to the MAC entity the predicted duration of the TXOP indicated in the HE-SIG-A field.

The PHY entity shall check the BSS color in the HE-SIG-A field. If the BSS color field doesn't contain an appropriate value, the PHY entity shall set the PHY_RXSTART.indication(RXVECTOR) then set PHY_RXEND.indication(Filtered).

After the HE-SIG-A field, the PHY entity shall receive the HE-SIG-B field for the number of symbols predicted from the HE-SIG-A field. If a common field is presents in the HE-SIG-B field, the PHY entity shall check the CRC of the common field. If the CRC in the common field is valid or the common field is not presented, the PHY entity shall search for an intended STA-ID in each user-specific subfield that has a valid CRC. If no CRC is valid or no intended STA-ID is detected, the PHY entity shall set PHY_RXSTART.indication (RXVECTOR) then set PHY_RXEND.indication (Filtered).

If a complete allocation of an intended STA-ID is detected in block with a valid CRC, the PHY entity shall continue receiving the HE-STF field for 4 μs after the HE-SIG-B field for the detected and intended STA. The PHY entity shall maintain PHY-CCA.indication(BUSY, channellist) primitive for the predicted duration of the transmitted PPDU for all supported modes, unsupported modes, Reserved HE-SIG-A Indication, and for an invalid HE-SIG-A CRC. If the HE-SIG-A field indicates an unsupported mode, the PHY shall issue a PHY-RXEND.indication(UnsupportedRate) primitive. If the HE-SIG-A field indicates an invalid CRC or Reserved HE-SIG-A Indication, the PHY shall issue the error condition PHY-RXEND.indication(FormatViolation) primitive.

If signal loss occurs during reception prior to completion of the PSDU reception, the error condition PHY-RXEND-.indication(CarrierLost) shall be reported to the MAC. After waiting for the end of the PPDU, the PHY shall set the PHY-CCA.indication(IDLE) primitive and return to the RX IDLE state.

Except for an HE NDP, a data field follows a HE-STF and HE-LTF of an HE PPDU. The PHY entity shall calculate $N_{SYM}$ and $T_{PE}$ as follows:

$$N_{SYM} = \left\lfloor \frac{T_{DATA\_EST}}{T_{SYM}} \right\rfloor - b_2 \qquad \text{Eq. 48}$$

$$T_{PE} = \left\lfloor \frac{T_{DATA\_EST} - (N_{SYM} \times T_{SYM})}{4} \right\rfloor \times 4 \text{ μs} \qquad \text{Eq. 49}$$

where $b_2$ is a PE disambiguity indication in a packet extension field of an HE-SIG-A field and $T_{DATA\_EST}$ is an estimate of the duration of the HE-DATA field determined according to the appropriate one of the following three formulas.

For an HE_MU PPDU, $T_{DATA\_EST}$ is determined by:

$$T_{DATA\_EST} = \frac{L\_LENGTH + m + 3}{3} \times 4 - T_{RL-SIG} - T_{HE-SIG-A} - T_{HE-SIG-B} - T_{HE\_PREAMBLE} \qquad \text{Eq. 50}$$

For an HE SU PPDU and HE trigger based PPDU, $T_{DATA\_EST}$ is determined by:

$$T_{DATA\_EST} = \frac{L\_LENGTH + m + 3}{3} \times 4 - T_{RL-SIG} - T_{HE-SIG-A} - T_{HE\_PREAMBLE} \qquad \text{Eq. 51}$$

For an HE Extended PPDU, $T_{DATA\_EST}$ is determined by:

$$T_{DATA\_EST} = \frac{L\_LENGTH + m + 3}{3} \times 4 - T_{RL-SIG} - T_{HE-SIG-A} - T_{HE-SIG-A-E} - T_{HE\_PREAMBLE} \qquad \text{Eq. 52}$$

where, for the received HE PPDU, $T_{PE}$ is a duration of a Packet Extension, $N_{SYM}$ is a number of symbols in a Data field, L_LENGTH is a value indicated by a length field of an L-SIG field, $T_{HE\_PREAMBLE}$ is a duration of HE preamble, and m is one when the HE PPDU is an HE MU PPDU or an HE extended range SU PPDU and is two otherwise.

The received PSDU bits are assembled into octets, decoded, and presented to the MAC using a series of PHY-DATA.indication(DATA) primitive exchanges. Any final bits that cannot be assembled into a complete octet are considered pad bits and discarded. After the reception of the final bit of the last PSDU octet, and possible padding and tail bits, the PHY entity shall check whether packet extension is applied. If packet extension and/or signal extension are applied, the PHY entity shall wait until the packet extension and signal extension expires before returning to the RX IDLE state, as shown in FIGS. 28A and 28B.

Figure 29:
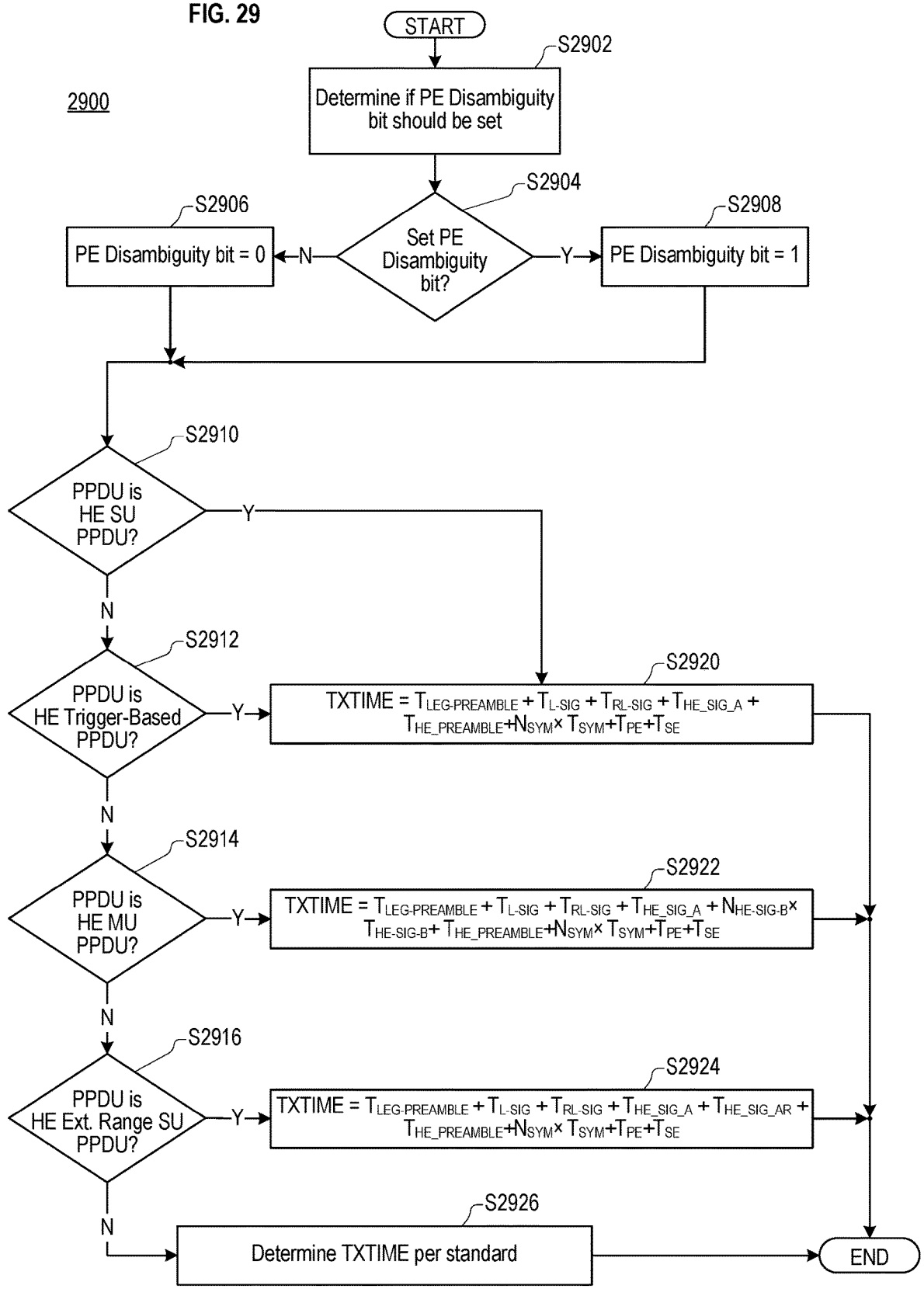
FIG. 29 illustrates a process for determining a Packet Extension (PE) Disambiguity bit and a transmission time TXTIME of an HE PPDU, according to an embodiment.

FIG. 29 illustrates a process 2900, according to an embodiment, for determining a Packet Extension (PE) Disambiguity bit of an HE-SIG-A field of an HE PPDU and a transmission time TXTIME of the HE PPDU, where the HE PPDU is to be transmitted on a 2.4 GHz band.

At S2902, the process 2900 determines whether the PE Disambiguity bit should be set to 1 or 0. In a first embodiment, the process 2900 determines that the PE Disambiguity bit should be set according to a relationship such as the relationship shown in Equation 43. In a second embodiment, the process 2900 determines that the PE Disambiguity bit should be set according to a relationship such as one of the relationship shown in Equations 19-21.

When the relationship is satisfied, the process 2900 determines that the PE Disambiguity bit should be set to 1, otherwise, the process 2900 determines that the PE Disambiguity bit should be set to 0.

At S2904, when the process 2900 determined that the PE Disambiguity bit is set to 1, the process 2900 proceeds to S2908, and otherwise the process 2900 proceeds to S2906.

At S2906, the process 2900 assigns a first value (such as zero) to the PE Disambiguity bit, and then proceeds to S2910.

At S2908, the process 2900 assigns a second value (such as one) to the PE Disambiguity bit, and then proceeds to S2910.

At S2910, the process 2900 proceeds to S2920 when the HE PPDU is an HE Single User (SU) PPDU, and proceeds to S2912 otherwise.

At S2912, the process 2900 proceeds to S2920 when the HE PPDU is an HE Trigger-based PPDU, and proceeds to S2914 otherwise.

At S2914, the process 2900 proceeds to S2922 when the HE PPDU is an HE Multi User (MU) PPDU, and proceeds to S2916 otherwise.

At S2916, the process 2900 proceeds to S2924 when the HE PPDU is an HE Extended Range SU PPDU, and proceeds to S2926 otherwise.

At S2920, the process 2900 determines a transmission time TXTIME of the HE PPDU. In the first embodiment, the equation is Equation 44. In the second embodiment, the equation is Equation 22. The process 2900 then ends.

At S2922, the process 2900 determines a transmission time TXTIME of the HE PPDU. In the first embodiment, the equation is Equation 45. In the second embodiment, the equation is Equation 23. The process 2900 then ends.

At S2924, the process 2900 determines a transmission time TXTIME of the HE PPDU. In the first embodiment, the equation is Equation 46. In the second embodiment, the equation is Equation 24. The process 2900 then ends.

At S2926, the process 2900 determines a transmission time TXTIME of the HE PPDU according to an extant IEEE 802.11 standard. The process 2900 then ends.

Embodiments improve the fairness of access to a shared wireless medium. In particular, embodiments promote fairness of access between HE and non-HE stations. In some embodiments, fairness is promoted by having an HE-capable station that receives an HE PPDU in a 2.4 GHz band waiting for a signal extension duration and a time gap after the HE PPDU before attempting to access the medium. The HE-capable station may be caused to wait for the signal extension duration and a time gap by the transmitter of the HE PPDU: 1) setting a length indication of an L-SIG field of the received PPDU to include the signal extension duration and a time gap and 2) setting a PE-disambiguity field of a HE-SIG-A field to appropriate values.

The solutions provided herein have been described with reference to a wireless LAN system; however, it should be understood that these solutions are also applicable to other network environments, such as cellular telecommunication networks, wired networks, etc.

The above explanation and figures are applied to an HE station, an HE frame, an HE PPDU, an HE-SIG field and the like of the IEEE 802.11ax amendment, but they can also applied to a receiver, a frame, PPDU, a SIG field, and the like of another future amendment of IEEE 802.11.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method performed by a receiving wireless device, the method comprising:
   receiving a High-Efficiency (HE) PHY Protocol Data Unit (PPDU) including a data field;
   estimating a duration of a data field;
   determining a number of symbols in the data field according to $$N_{SYM} = \left\lfloor \frac{T_{DATA\_EST}}{T_{SYM}} \right\rfloor - b_2$$

wherein $N_{SYM}$ is the number of symbols, $T_{DATA\_EST}$ is the estimated duration of the data field, $T_{SYM}$ is a duration of a symbol included in the data field, and $b_2$ is a value of a Packet Extension (PE) Disambiguity bit of a PE field of an HE Signal A (HE-SIG-A) field of the HE PPDU;
   determining a duration of a packet extension of the HE PPDU according to $$T_{PE} = \left\lfloor \frac{T_{DATA\_EST} - (N_{SYM} \times T_{SYM})}{4} \right\rfloor \times 4 \; \mu s;$$

wherein $T_{PE}$ is the duration of the packet extension; and
   determining a state of a primary channel used to receive the HE PPDU as idle after waiting for the duration of the packet extension.

2. The method of claim 1, wherein estimating the duration of the data field comprises determining the estimated duration of the data field according to $$T_{DATA\_EST} = \frac{\text{L\_LENGTH} + m + 3}{3} \times 4 - T_{RL-SIG} - T_{HE-SIG-A} - T_{HE-SIG-B} - T_{HE\_PREAMBLE}$$

wherein L_LENGTH is a value indicated by a length field of an L-SIG field of the HE PPDU, $T_{RL-SIG}$ is a Repeated non-HT SIGNAL field duration of the HE PPDU, $T_{HE-SIG-A}$ is the HE-SIG-A field duration, $T_{HE-SIG-B}$ is a duration of each OFDM symbol in an HE Signal B (HE-SIG-B) field of the HE PPDU, $T_{HE\_PREAMBLE}$ is a duration of an HE preamble of the HE PPDU, and m is one when the HE PPDU is an HE_MU PPDU or an HE extended range SU PPDU and is two otherwise.

3. The method of claim 1, wherein estimating the duration of the data field comprises determining the estimated duration of the data field according to $$T_{DATA\_EST} = \frac{\text{L\_LENGTH} + m + 3}{3} \times 4 - T_{RL-SIG} - T_{HE-SIG-A} - T_{HE\_PREAMBLE}$$

wherein L_LENGTH is a value indicated by a length field of an L-SIG field of the HE PPDU, $T_{RL-SIG}$ is a Repeated non-HT SIGNAL field duration of the HE PPDU, $T_{HE-SIG-A}$ is the HE-SIG-A field duration, $T_{HE\_PREAMBLE}$ is a duration of an HE preamble of the HE PPDU, and m is one when the HE PPDU is an HE_MU PPDU or an HE extended range SU PPDU and is two otherwise.

4. The method of claim 1, wherein estimating the duration of the data field comprises determining the estimated duration of the data field according to $$T_{DATA\_EST} = \frac{\text{L\_LENGTH} + m + 3}{3} \times 4 - T_{RL-SIG} - T_{HE-SIG-A} - T_{HE-SIG-A-R} - T_{HE\_PREAMBLE}$$

wherein L_LENGTH is a value indicated by a length field of an L-SIG field of the HE PPDU, $T_{RL-SIG}$ is a Repeated non-HT SIGNAL field duration of the HE PPDU, $T_{HE-SIG-A}$ is the HE-SIG-A field duration, $T_{HE-SIG-A-R}$ is an HE-SIG-A field duration in an HE extended range Single User (SU) PPDU, $T_{HE\_PREAMBLE}$ is a duration of an HE preamble of the HE PPDU, and m is one when the HE PPDU is an HE_MU PPDU or an HE extended range SU PPDU and is two otherwise.

5. A wireless device comprising:
   a receiver circuit;
   wherein the wireless device is configured to perform steps comprising:
   receiving, using the receiver circuit, a High-Efficiency (HE) PHY Protocol Data Unit (PPDU) including a data field;
   estimating a duration of a data field;
   determining a number of symbols in the data field according to $$N_{SYM} = \left\lfloor \frac{T_{DATA\_EST}}{T_{SYM}} \right\rfloor - b_2$$

wherein $N_{SYM}$ is the number of symbols, $T_{DATA\_EST}$ is the estimated duration of the data field, $T_{SYM}$ is a duration of a symbol included in the data field, and $b_2$ is a value of a Packet Extension (PE) Disambiguity bit of a PE field of an HE Signal A (HE-SIG-A) field of the HE PPDU;
   determining a duration of a packet extension of the HE PPDU according to $$T_{PE} = \left\lfloor \frac{T_{DATA\_EST} - (N_{SYM} \times T_{SYM})}{4} \right\rfloor \times 4 \; \mu s;$$

wherein $T_{PE}$ is the duration of the packet extension; and
   determining a state of a primary channel used to receive the HE PPDU as idle after waiting for the duration of the packet extension.

6. The wireless device of claim 5, wherein estimating the duration of the data field comprises determining the estimated duration of the data field according to $$T_{DATA\_EST} = \frac{\text{L\_LENGTH} + m + 3}{3} \times 4 - T_{RL-SIG} - T_{HE-SIG-A} - T_{HE-SIG-B} - T_{HE\_PREAMBLE}$$

wherein L_LENGTH is a value indicated by a length field of an L-SIG field of the HE PPDU, $T_{RL-SIG}$ is a Repeated non-HT SIGNAL field duration of the HE PPDU, $T_{HE-SIG-A}$ is the HE-SIG-A field duration, $T_{HE-SIG-B}$ is a duration of each OFDM symbol in an HE Signal B (HE-SIG-B) field of the HE PPDU, $T_{HE\_PREAMBLE}$ is a duration of an HE preamble of the HE PPDU, and m is one when the HE PPDU is an HE_MU PPDU or an HE extended range SU PPDU and is two otherwise.

7. The wireless device of claim 5, wherein estimating the duration of the data field comprises determining the estimated duration of the data field according to $$T_{DATA\_EST} = \frac{L\_LENGTH + m + 3}{3} \times 4 - T_{RL-SIG} - T_{HE-SIG-A} - T_{HE\_PREAMBLE}$$

wherein L_LENGTH is a value indicated by a length field of an L-SIG field of the HE PPDU, $T_{RL-SIG}$ is a Repeated non-HT SIGNAL field duration of the HE PPDU, $T_{HE-SIG-A}$ is the HE-SIG-A field duration, $T_{HE\_PREAMBLE}$ is a duration of an HE preamble of the HE PPDU, and m is one when the HE PPDU is an HE_MU PPDU or an HE extended range SU PPDU and is two otherwise.

8. The wireless device of claim 5, wherein estimating the duration of the data field comprises determining the estimated duration of the data field according to $$T_{DATA\_EST} = \frac{L\_LENGTH + m + 3}{3} \times 4 - T_{RL-SIG} - T_{HE-SIG-A} - T_{HE-SIG-A-R} - T_{HE\_PREAMBLE}$$

wherein L_LENGTH is a value indicated by a length field of an L-SIG field of the HE PPDU, $T_{RL-SIG}$ is a Repeated non-HT SIGNAL field duration of the HE PPDU, $T_{HE-SIG-A}$ is the HE-SIG-A field duration, $T_{HE-SIG-A-R}$ is an HE-SIG-A field duration in an HE extended range Single User (SU) PPDU, $T_{HE\_PREAMBLE}$ is a duration of an HE preamble of the HE PPDU, and m is one when the HE PPDU is an HE_MU PPDU or an HE extended range SU PPDU and is two otherwise.

9. A non-transitory computer-readable media (CRM) including computer programming instructions that, when executed by a wireless communication device, cause the wireless communication device to perform steps comprising:

receiving a High-Efficiency (HE) PHY Protocol Data Unit (PPDU) including a data field;

estimating a duration of a data field;

determining a number of symbols in the data field according to $$N_{SYM} = \left\lfloor \frac{T_{DATA\_EST}}{T_{SYM}} \right\rfloor - b_2$$

wherein $N_{SYM}$ is the number of symbols, $T_{DATA\_EST}$ is the estimated duration of the data field, $T_{SYM}$ is a duration of a symbol included in the data field, and $b_2$ is a value of a Packet Extension (PE) Disambiguity bit of a PE field of an HE Signal A (HE-SIG-A) field of the HE PPDU;

determining a duration of a packet extension of the HE PPDU according to $$T_{PE} = \left\lfloor \frac{T_{DATA\_EST} - (N_{SYM} \times T_{SYM})}{4} \right\rfloor \times 4 \; \mu s;$$

wherein $T_{PE}$ is the duration of the packet extension; and determining a state of a primary channel used to receive the HE PPDU as idle after waiting for the duration of the packet extension.

10. The method of claim 9, wherein estimating the duration of the data field comprises determining the estimated duration of the data field according to $$T_{DATA\_EST} = \frac{L\_LENGTH + m + 3}{3} \times 4 - T_{RL-SIG} - T_{HE-SIG-A} - T_{HE-SIG-B} - T_{HE\_PREAMBLE}$$

wherein L_LENGTH is a value indicated by a length field of an L-SIG field of the HE PPDU, $T_{RL-SIG}$ is a Repeated non-HT SIGNAL field duration of the HE PPDU, $T_{HE-SIG-A}$ is the HE-SIG-A field duration, $T_{HE-SIG-B}$ is a duration of each OFDM symbol in an HE Signal B (HE-SIG-B) field of the HE PPDU, $T_{HE\_PREAMBLE}$ is a duration of an HE preamble of the HE PPDU, and m is one when the HE PPDU is an HE_MU PPDU or an HE extended range SU PPDU and is two otherwise.

11. The method of claim 9, wherein estimating the duration of the data field comprises determining the estimated duration of the data field according to $$T_{DATA\_EST} = \frac{L\_LENGTH + m + 3}{3} \times 4 - T_{RL-SIG} - T_{HE-SIG-A} - T_{HE\_PREAMBLE}$$

wherein L_LENGTH is a value indicated by a length field of an L-SIG field of the HE PPDU, $T_{RL-SIG}$ is a Repeated non-HT SIGNAL field duration of the HE PPDU, $T_{HE-SIG-A}$ is the HE-SIG-A field duration, $T_{HE\_PREAMBLE}$ is a duration of an HE preamble of the HE PPDU, and m is one when the HE PPDU is an HE_MU PPDU or an HE extended range SU PPDU and is two otherwise.

12. The method of claim 9, wherein estimating the duration of the data field comprises determining the estimated duration of the data field according to $$T_{DATA\_EST} = \frac{L\_LENGTH + m + 3}{3} \times 4 - T_{RL-SIG} - T_{HE-SIG-A} - T_{HE-SIG-A-R} - T_{HE\_PREAMBLE}$$

wherein L_LENGTH is a value indicated by a length field of an L-SIG field of the HE PPDU, $T_{RL-SIG}$ is a Repeated non-HT SIGNAL field duration of the HE PPDU, $T_{HE-SIG-A}$ is the HE-SIG-A field duration, $T_{HE-SIG-A-R}$ is an HE-SIG-A field duration in an HE extended range Single User (SU) PPDU, $T_{HE\_PREAMBLE}$ is a duration of an HE preamble of the HE PPDU and m is one when the HE PPDU is an HE_MU PPDU or an HE extended range SU PPDU and is two otherwise.

* * * * *